(12) United States Patent
Cai et al.

(10) Patent No.: US 10,375,155 B1
(45) Date of Patent: Aug. 6, 2019

(54) SYSTEM AND METHOD FOR ACHIEVING HARDWARE ACCELERATION FOR ASYMMETRIC FLOW CONNECTIONS

(71) Applicant: F5 Networks, Inc., Seattle, WA (US)

(72) Inventors: Hao Cai, Sammamish, WA (US); Qi Lu, Kirkland, WA (US)

(73) Assignee: F5 Networks, Inc., Seattle, WA (US)

( * ) Notice: Subject to any disclaimer, the term of this patent is extended or adjusted under 35 U.S.C. 154(b) by 376 days.

(21) Appl. No.: 15/408,354

(22) Filed: Jan. 17, 2017

Related U.S. Application Data

(63) Continuation of application No. 13/770,685, filed on Feb. 19, 2013.

(51) Int. Cl.
*H04L 29/08* (2006.01)
*H04L 29/06* (2006.01)
*H04L 12/24* (2006.01)

(52) U.S. Cl.
CPC ...... *H04L 67/1002* (2013.01); *H04L 41/0896* (2013.01); *H04L 67/141* (2013.01); *H04L 67/42* (2013.01); *H04L 69/22* (2013.01)

(58) Field of Classification Search
CPC .. H04L 41/0896; H04L 47/10; H04L 67/1002
See application file for complete search history.

(56) References Cited

U.S. PATENT DOCUMENTS

| | | | |
|---|---|---|---|
| 3,950,735 A | 4/1976 | Patel | |
| 4,644,532 A | 2/1987 | George et al. | |
| 4,897,781 A | 1/1990 | Chang et al. | |
| 4,914,650 A | 4/1990 | Sriram | |
| 4,965,772 A | 10/1990 | Daniel et al. | |

(Continued)

FOREIGN PATENT DOCUMENTS

| | | |
|---|---|---|
| AU | 2003300350 | 7/2004 |
| CA | 2080530 | 4/1994 |

(Continued)

OTHER PUBLICATIONS

"A Process for Selective Routing of Servlet Content to Transcoding Modules," Research Disclosure 422124, Jun. 1999, pp. 889-890, IBM Corporation.

(Continued)

*Primary Examiner* — Michael A Keller
*Assistant Examiner* — Jsing Forng Lin
(74) *Attorney, Agent, or Firm* — Pepper Hamilton LLP

(57) ABSTRACT

Performance of connection flow management between a hardware-based network interface and a software module of a network traffic management device is disclosed. A flow connection setup for a flow connection is established between a client device and a server at the network traffic management device. It is then determined if the flow connection is symmetrical or asymmetrical in nature. A flow signature entry and a transformation data entry for the flow connection is generated, by software executed by the network traffic management device, in opposing first and second symmetric or asymmetric flow directions. The flow signature entry and the transformation data entry for the first and second flow directions is sent from the software module to the network interface. The network interface stores and utilizes the flow signature entry and the transformation data entry to perform acceleration on data packets in the first and second flow directions.

21 Claims, 10 Drawing Sheets

(56) References Cited

U.S. PATENT DOCUMENTS

| | | |
|---|---|---|
| 4,991,030 A | 2/1991 | Krakauer et al. |
| 5,023,826 A | 6/1991 | Patel |
| 5,053,953 A | 10/1991 | Patel |
| 5,167,024 A | 11/1992 | Smith et al. |
| 5,218,695 A | 6/1993 | Noveck et al. |
| 5,282,201 A | 1/1994 | Frank et al. |
| 5,299,312 A | 3/1994 | Rocco, Jr. |
| 5,303,368 A | 4/1994 | Kotaki |
| 5,327,529 A | 7/1994 | Fults et al. |
| 5,367,635 A | 11/1994 | Bauer et al. |
| 5,371,852 A | 12/1994 | Attanasio et al. |
| 5,388,237 A | 2/1995 | Sodos et al. |
| 5,406,502 A | 4/1995 | Haramaty et al. |
| 5,473,362 A | 12/1995 | Fitzgerald et al. |
| 5,475,857 A | 12/1995 | Dally |
| 5,477,541 A | 12/1995 | White et al. |
| 5,511,177 A | 4/1996 | Kagimasa et al. |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,537,585 A | 7/1996 | Blickenstaff et al. |
| 5,548,724 A | 8/1996 | Akizawa et al. |
| 5,550,816 A | 8/1996 | Hardwick et al. |
| 5,550,965 A | 8/1996 | Gabbe et al. |
| 5,581,764 A | 12/1996 | Fitzgerald et al. |
| 5,583,995 A | 12/1996 | Gardner et al. |
| 5,586,260 A | 12/1996 | Hu |
| 5,590,320 A | 12/1996 | Maxey |
| 5,596,742 A | 1/1997 | Agarwal et al. |
| 5,606,665 A | 2/1997 | Yang et al. |
| 5,611,049 A | 3/1997 | Pitts |
| 5,623,490 A | 4/1997 | Richter et al. |
| 5,649,194 A | 7/1997 | Miller et al. |
| 5,649,200 A | 7/1997 | Leblang et al. |
| 5,663,018 A | 9/1997 | Cummings et al. |
| 5,668,943 A | 9/1997 | Attanasio et al. |
| 5,692,180 A | 11/1997 | Lee |
| 5,699,361 A | 12/1997 | Ding et al. |
| 5,721,779 A | 2/1998 | Funk |
| 5,724,512 A | 3/1998 | Winterbottom |
| 5,742,765 A | 4/1998 | Wong et al. |
| 5,752,023 A | 5/1998 | Choucri et al. |
| 5,761,484 A | 6/1998 | Agarwal et al. |
| 5,761,534 A | 6/1998 | Lundberg et al. |
| 5,768,423 A | 6/1998 | Aref et al. |
| 5,774,660 A | 6/1998 | Brendel et al. |
| 5,790,554 A | 8/1998 | Pitcher et al. |
| 5,797,033 A | 8/1998 | Ecclesine |
| 5,802,052 A | 9/1998 | Venkataraman |
| 5,806,061 A | 9/1998 | Chaudhuri et al. |
| 5,812,550 A | 9/1998 | Sohn et al. |
| 5,825,772 A | 10/1998 | Dobbins et al. |
| 5,828,835 A | 10/1998 | Isfeld et al. |
| 5,832,283 A | 11/1998 | Chou et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,875,296 A | 2/1999 | Shi et al. |
| 5,884,303 A | 3/1999 | Brown |
| 5,892,914 A | 4/1999 | Pitts |
| 5,892,932 A | 4/1999 | Kim |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,919,247 A | 7/1999 | Van Hoff et al. |
| 5,920,873 A | 7/1999 | Van Huben et al. |
| 5,926,816 A | 7/1999 | Bauer et al. |
| 5,936,939 A | 8/1999 | Des Jardins et al. |
| 5,937,406 A | 8/1999 | Balabine et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 5,991,302 A | 11/1999 | Berl et al. |
| 5,995,491 A | 11/1999 | Richter et al. |
| 5,999,664 A | 12/1999 | Mahoney et al. |
| 6,006,260 A | 12/1999 | Barrick, Jr. et al. |
| 6,006,264 A | 12/1999 | Colby et al. |
| 6,012,083 A | 1/2000 | Savitzky et al. |
| 6,026,090 A | 2/2000 | Benson et al. |
| 6,026,443 A | 2/2000 | Oskouy et al. |
| 6,026,452 A | 2/2000 | Pitts |
| 6,026,500 A | 2/2000 | Topff et al. |
| 6,028,857 A | 2/2000 | Poor |
| 6,029,168 A | 2/2000 | Frey |
| 6,029,175 A | 2/2000 | Chow et al. |
| 6,041,365 A | 3/2000 | Kleinerman |
| 6,044,367 A | 3/2000 | Wolff |
| 6,047,129 A | 4/2000 | Frye |
| 6,047,356 A | 4/2000 | Anderson et al. |
| 6,051,169 A | 4/2000 | Brown et al. |
| 6,067,558 A | 5/2000 | Wendt et al. |
| 6,070,219 A | 5/2000 | McAlpine et al. |
| 6,072,942 A | 6/2000 | Stockwell et al. |
| 6,078,929 A | 6/2000 | Rao |
| 6,078,956 A | 6/2000 | Bryant et al. |
| 6,085,234 A | 7/2000 | Pitts et al. |
| 6,088,694 A | 7/2000 | Burns et al. |
| 6,092,196 A | 7/2000 | Reiche |
| 6,104,706 A | 8/2000 | Richter et al. |
| 6,108,703 A | 8/2000 | Leighton et al. |
| 6,111,876 A | 8/2000 | Frantz et al. |
| 6,115,802 A | 9/2000 | Took et al. |
| 6,128,279 A | 10/2000 | ONeil et al. |
| 6,128,627 A | 10/2000 | Mattis et al. |
| 6,128,657 A | 10/2000 | Okanoya et al. |
| 6,128,717 A | 10/2000 | Harrison et al. |
| 6,154,777 A | 11/2000 | Ebrahim |
| 6,157,950 A | 12/2000 | Krishnan |
| 6,160,874 A | 12/2000 | Dickerman et al. |
| 6,161,145 A | 12/2000 | Bainbridge et al. |
| 6,161,185 A | 12/2000 | Guthrie et al. |
| 6,170,022 B1 | 1/2001 | Linville et al. |
| 6,178,423 B1 | 1/2001 | Douceur et al. |
| 6,181,336 B1 | 1/2001 | Chin et al. |
| 6,182,139 B1 | 1/2001 | Brendel |
| 6,192,051 B1 | 2/2001 | Lipman et al. |
| 6,202,156 B1 | 3/2001 | Kalajan |
| 6,223,206 B1 | 4/2001 | Dan et al. |
| 6,223,648 B1 | 5/2001 | Tomita |
| 6,233,612 B1 | 5/2001 | Fruchtman et al. |
| 6,237,008 B1 | 5/2001 | Beal et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,256,031 B1 | 7/2001 | Meijer et al. |
| 6,259,405 B1 | 7/2001 | Stewart et al. |
| 6,260,070 B1 | 7/2001 | Shah |
| 6,263,368 B1 | 7/2001 | Martin |
| 6,282,610 B1 | 8/2001 | Bergsten |
| 6,289,012 B1 | 9/2001 | Harrington et al. |
| 6,289,345 B1 | 9/2001 | Yasue |
| 6,292,832 B1 | 9/2001 | Shah et al. |
| 6,298,380 B1 | 10/2001 | Coile et al. |
| 6,304,913 B1 | 10/2001 | Rune |
| 6,308,162 B1 | 10/2001 | Ouimet et al. |
| 6,324,581 B1 | 11/2001 | Xu et al. |
| 6,327,622 B1 | 12/2001 | Jindal et al. |
| 6,329,985 B1 | 12/2001 | Tamer et al. |
| 6,330,574 B1 | 12/2001 | Murashita |
| 6,338,082 B1 | 1/2002 | Schneider |
| 6,339,785 B1 | 1/2002 | Feigenbaum |
| 6,343,324 B1 | 1/2002 | Hubis et al. |
| 6,347,337 B1 | 2/2002 | Shinohara |
| 6,347,339 B1 | 2/2002 | Morris et al. |
| 6,349,343 B1 | 2/2002 | Foody et al. |

(56) References Cited

U.S. PATENT DOCUMENTS

| | | |
|---|---|---|
| 6,353,848 B1 | 3/2002 | Morris |
| 6,360,270 B1 | 3/2002 | Cherkasova et al. |
| 6,363,056 B1 | 3/2002 | Beigi et al. |
| 6,370,527 B1 | 4/2002 | Singhal |
| 6,370,543 B2 | 4/2002 | Hoffert et al. |
| 6,374,263 B1 | 4/2002 | Bunger et al. |
| 6,374,300 B2 | 4/2002 | Masters |
| 6,374,336 B1 | 4/2002 | Peters et al. |
| 6,388,989 B1 | 5/2002 | Malhotra |
| 6,389,433 B1 | 5/2002 | Bolosky et al. |
| 6,389,462 B1 | 5/2002 | Cohen et al. |
| 6,393,581 B1 | 5/2002 | Friedman et al. |
| 6,396,833 B1 | 5/2002 | Zhang et al. |
| 6,397,246 B1 | 5/2002 | Wolfe |
| 6,411,986 B1 | 6/2002 | Susai et al. |
| 6,412,004 B1 | 6/2002 | Chen et al. |
| 6,430,562 B1 | 8/2002 | Kardos et al. |
| 6,434,081 B1 | 8/2002 | Johnson et al. |
| 6,438,595 B1 | 8/2002 | Blumenau et al. |
| 6,446,108 B1 | 9/2002 | Rosenberg et al. |
| 6,466,580 B1 | 10/2002 | Leung |
| 6,469,983 B2 | 10/2002 | Narayana et al. |
| 6,477,544 B1 | 11/2002 | Bolosky et al. |
| 6,480,476 B1 | 11/2002 | Willars |
| 6,484,261 B1 | 11/2002 | Wiegel |
| 6,487,561 B1 | 11/2002 | Ofek et al. |
| 6,490,624 B1 | 12/2002 | Sampson et al. |
| 6,493,804 B1 | 12/2002 | Soltis et al. |
| 6,510,135 B1 | 1/2003 | Almulhem et al. |
| 6,510,458 B1 | 1/2003 | Berstis et al. |
| 6,513,061 B1 | 1/2003 | Ebata et al. |
| 6,514,085 B2 | 2/2003 | Slattery et al. |
| 6,516,350 B1 | 2/2003 | Lumelsky et al. |
| 6,516,351 B2 | 2/2003 | Borr |
| 6,519,643 B1 | 2/2003 | Foulkes et al. |
| 6,529,508 B1 | 3/2003 | Li et al. |
| 6,542,909 B1 | 4/2003 | Tamer et al. |
| 6,542,936 B1 | 4/2003 | Mayle et al. |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,560,230 B1 | 5/2003 | Li et al. |
| 6,574,220 B1 | 6/2003 | Petty |
| 6,578,069 B1 | 6/2003 | Hopmann et al. |
| 6,601,084 B1 | 7/2003 | Bhaskaran et al. |
| 6,601,101 B1 | 7/2003 | Lee et al. |
| 6,606,663 B1 | 8/2003 | Liao et al. |
| 6,612,490 B1 | 9/2003 | Herrendoerfer et al. |
| 6,615,267 B1 | 9/2003 | Whalen et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,346 B1 | 11/2003 | Mahalingaiah et al. |
| 6,654,701 B2 | 11/2003 | Halley |
| 6,661,802 B1 | 12/2003 | Homberg et al. |
| 6,683,873 B1 | 1/2004 | Kwok et al. |
| 6,691,165 B1 | 2/2004 | Bruck et al. |
| 6,694,517 B1 | 2/2004 | James et al. |
| 6,697,871 B1 | 2/2004 | Hansen |
| 6,700,871 B1 | 3/2004 | Harper et al. |
| 6,701,415 B1 | 3/2004 | Hendren, III |
| 6,704,755 B2 | 3/2004 | Midgley et al. |
| 6,708,187 B1 | 3/2004 | Shanumgam et al. |
| 6,708,220 B1 | 3/2004 | Olin |
| 6,718,380 B1 | 4/2004 | Mohaban et al. |
| 6,721,794 B2 | 4/2004 | Taylor et al. |
| 6,728,265 B1 | 4/2004 | Yavatkar et al. |
| 6,728,704 B2 | 4/2004 | Mao et al. |
| 6,738,357 B1 | 5/2004 | Richter et al. |
| 6,738,790 B1 | 5/2004 | Klein et al. |
| 6,742,035 B1 | 5/2004 | Zayas et al. |
| 6,742,045 B1 | 5/2004 | Albert et al. |
| 6,744,776 B1 | 6/2004 | Kalkunte et al. |
| 6,748,420 B1 | 6/2004 | Quatrano et al. |
| 6,748,457 B2 | 6/2004 | Fallon et al. |
| 6,751,663 B1 | 6/2004 | Farrell et al. |
| 6,754,228 B1 | 6/2004 | Ludwig |
| 6,754,699 B2 | 6/2004 | Swildens et al. |
| 6,757,706 B1 | 6/2004 | Dong et al. |
| 6,754,215 B1 | 7/2004 | Snyder, II et al. |
| 6,760,337 B1 | 7/2004 | Snyder, II et al. |
| 6,760,775 B1 | 7/2004 | Anerousis et al. |
| 6,772,219 B1 | 8/2004 | Shobatake |
| 6,775,672 B2 | 8/2004 | Mahalingam et al. |
| 6,775,673 B2 | 8/2004 | Mahalingam et al. |
| 6,775,679 B2 | 8/2004 | Gupta |
| 6,779,039 B1 | 8/2004 | Bommareddy et al. |
| 6,781,986 B1 | 8/2004 | Sabaa et al. |
| 6,781,990 B1 | 8/2004 | Puri et al. |
| 6,782,450 B2 | 8/2004 | Arnott et al. |
| 6,785,236 B1 | 8/2004 | Lo et al. |
| 6,795,860 B1 | 9/2004 | Shah |
| 6,798,777 B1 | 9/2004 | Ferguson et al. |
| 6,801,960 B1 | 10/2004 | Ericson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,820,133 B1 | 11/2004 | Grove et al. |
| 6,826,613 B1 | 11/2004 | Wang et al. |
| 6,829,238 B2 | 12/2004 | Tokuyo et al. |
| 6,839,761 B2 | 1/2005 | Kadyk et al. |
| 6,847,959 B1 | 1/2005 | Arrouye et al. |
| 6,847,970 B2 | 1/2005 | Keller et al. |
| 6,850,997 B1 | 2/2005 | Rooney et al. |
| 6,865,593 B1 | 3/2005 | Reshef et al. |
| 6,868,082 B1 | 3/2005 | Allen, Jr. et al. |
| 6,868,439 B2 | 3/2005 | Basu et al. |
| 6,868,447 B1 | 3/2005 | Slaughter et al. |
| 6,871,221 B1 | 3/2005 | Styles |
| 6,871,245 B2 | 3/2005 | Bradley |
| 6,876,629 B2 | 4/2005 | Beshai et al. |
| 6,876,654 B1 | 4/2005 | Hegde |
| 6,880,017 B1 | 4/2005 | Marce et al. |
| 6,883,137 B1 | 4/2005 | Girardot et al. |
| 6,888,836 B1 | 5/2005 | Cherkasova |
| 6,889,249 B2 | 5/2005 | Miloushev et al. |
| 6,904,040 B2 | 6/2005 | Salapura et al. |
| 6,914,881 B1 | 7/2005 | Mansfield et al. |
| 6,922,688 B1 | 7/2005 | Frey, Jr. |
| 6,928,082 B2 | 8/2005 | Liu et al. |
| 6,928,518 B2 | 8/2005 | Talagala |
| 6,934,706 B1 | 8/2005 | Mancuso et al. |
| 6,934,776 B2 | 8/2005 | Connor et al. |
| 6,938,039 B1 | 8/2005 | Bober et al. |
| 6,938,059 B2 | 8/2005 | Tamer et al. |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,373 B2 | 10/2005 | Testardi |
| 6,959,394 B1 | 10/2005 | Brickell et al. |
| 6,961,815 B2 | 11/2005 | Kistler et al. |
| 6,970,475 B1 | 11/2005 | Fraser et al. |
| 6,970,924 B1 | 11/2005 | Chu et al. |
| 6,973,455 B1 | 12/2005 | Vahalia et al. |
| 6,973,490 B1 | 12/2005 | Robertson et al. |
| 6,973,549 B1 | 12/2005 | Testardi |
| 6,975,592 B1 | 12/2005 | Seddigh et al. |
| 6,985,936 B2 | 1/2006 | Agarwalla et al. |
| 6,985,956 B2 | 1/2006 | Luke et al. |
| 6,986,015 B2 | 1/2006 | Testardi |
| 6,987,763 B2 | 1/2006 | Rochberger et al. |
| 6,990,074 B2 | 1/2006 | Wan et al. |
| 6,990,114 B1 | 1/2006 | Erimli et al. |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 6,999,457 B2 | 2/2006 | Shinohara |
| 6,999,912 B2 | 2/2006 | Loisey et al. |
| 7,003,533 B2 | 2/2006 | Noguchi et al. |
| 7,003,564 B2 | 2/2006 | Greuel et al. |
| 7,006,502 B2 | 2/2006 | Lin |

(56) References Cited

U.S. PATENT DOCUMENTS

| | | |
|---|---|---|
| 7,006,981 B2 | 2/2006 | Rose et al. |
| 7,007,092 B2 | 2/2006 | Peiffer |
| 7,010,553 B2 | 3/2006 | Chen et al. |
| 7,013,379 B1 | 3/2006 | Testardi |
| 7,020,644 B2 | 3/2006 | Jameson |
| 7,020,669 B2 | 3/2006 | McCann et al. |
| 7,023,974 B1 | 4/2006 | Brannam et al. |
| 7,024,427 B2 | 4/2006 | Bobbitt et al. |
| 7,035,212 B1 | 4/2006 | Mittal et al. |
| 7,039,061 B2 | 5/2006 | Connor et al. |
| 7,046,628 B2 | 5/2006 | Luhmann et al. |
| 7,051,112 B2 | 5/2006 | Dawson |
| 7,054,998 B2 | 5/2006 | Arnott et al. |
| 7,055,010 B2 | 5/2006 | Lin et al. |
| 7,058,633 B1 | 6/2006 | Gnagy et al. |
| 7,065,482 B2 | 6/2006 | Shorey et al. |
| 7,065,630 B1 | 6/2006 | Ledebohm et al. |
| 7,072,917 B2 | 7/2006 | Wong et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,286 B1 | 8/2006 | Malik |
| 7,089,491 B2 | 8/2006 | Feinberg et al. |
| 7,107,348 B2 | 9/2006 | Shimada et al. |
| 7,111,115 B2 | 9/2006 | Peters et al. |
| 7,113,962 B1 | 9/2006 | Kee et al. |
| 7,113,993 B1 | 9/2006 | Cappiello et al. |
| 7,113,996 B2 | 9/2006 | Kronenberg |
| 7,117,308 B1 | 10/2006 | Mitten et al. |
| 7,120,728 B2 | 10/2006 | Krakirian et al. |
| 7,120,746 B2 | 10/2006 | Campbell et al. |
| 7,124,196 B2 | 10/2006 | Hooper |
| 7,127,556 B2 | 10/2006 | Blumenau et al. |
| 7,113,967 B2 | 11/2006 | Fujie et al. |
| 7,133,863 B2 | 11/2006 | Teng et al. |
| 7,133,944 B2 | 11/2006 | Song et al. |
| 7,139,792 B1 | 11/2006 | Mishra et al. |
| 7,142,540 B2 | 11/2006 | Bendel et al. |
| 7,143,146 B2 | 11/2006 | Nakatani et al. |
| 7,146,524 B2 | 12/2006 | Patel et al. |
| 7,152,184 B2 | 12/2006 | Maeda et al. |
| 7,155,466 B2 | 12/2006 | Rodriguez et al. |
| 7,161,904 B2 | 1/2007 | Hussain |
| 7,164,678 B2 | 1/2007 | Connor |
| 7,165,095 B2 | 1/2007 | Sim |
| 7,167,821 B2 | 1/2007 | Hardwick et al. |
| 7,171,469 B2 | 1/2007 | Ackaouy et al. |
| 7,173,929 B1 | 2/2007 | Testardi |
| 7,174,393 B2 | 2/2007 | Boucher et al. |
| 7,181,523 B2 | 2/2007 | Sim |
| 7,191,163 B2 | 3/2007 | Herrera et al. |
| 7,194,579 B2 | 3/2007 | Robinson et al. |
| 7,197,615 B2 | 3/2007 | Arakawa et al. |
| 7,228,359 B1 | 6/2007 | Monteiro |
| 7,228,422 B2 | 6/2007 | Morioka et al. |
| 7,234,074 B2 | 6/2007 | Cohn et al. |
| 7,236,491 B2 | 6/2007 | Tsao et al. |
| 7,237,076 B2 | 6/2007 | Nakano et al. |
| 7,240,100 B1 | 7/2007 | Wein et al. |
| 7,243,089 B2 | 7/2007 | Becker-Szendy et al. |
| 7,243,094 B2 | 7/2007 | Tabellion et al. |
| 7,269,610 B2 | 8/2007 | Parker et al. |
| 7,269,168 B2 | 9/2007 | Roy et al. |
| 7,269,582 B2 | 9/2007 | Winter et al. |
| 7,272,150 B2 | 9/2007 | Bly et al. |
| 7,272,613 B2 | 9/2007 | Sim et al. |
| 7,272,654 B1 | 9/2007 | Brendel |
| 7,280,536 B2 | 10/2007 | Testardi |
| 7,281,030 B1 | 10/2007 | Davis |
| 7,283,470 B1 | 10/2007 | Sindhu et al. |
| 7,284,150 B2 | 10/2007 | Ma et al. |
| 7,287,082 B1 | 10/2007 | O'Toole, Jr. |
| 7,292,541 B1 | 11/2007 | CS |
| 7,293,097 B2 | 11/2007 | Borr |
| 7,293,099 B1 | 11/2007 | Kalajan |
| 7,293,133 B1 | 11/2007 | Colgrove et al. |
| 7,295,827 B2 | 11/2007 | Liu et al. |
| 7,296,263 B1 | 11/2007 | Jacob |
| 7,299,250 B2 | 11/2007 | Douceur et al. |
| 7,308,475 B1 | 12/2007 | Pruitt et al. |
| 7,308,703 B2 | 12/2007 | Wright et al. |
| 7,308,709 B1 | 12/2007 | Brezak et al. |
| 7,310,339 B1 | 12/2007 | Powers et al. |
| 7,321,926 B1 | 1/2008 | Zhang et al. |
| 7,324,525 B2 | 1/2008 | Fuhs et al. |
| 7,324,533 B1 | 1/2008 | DeLiberato et al. |
| 7,327,674 B2 | 2/2008 | Eberle et al. |
| 7,330,486 B2 | 2/2008 | Ko et al. |
| 7,333,999 B1 | 2/2008 | Njemanze |
| 7,340,571 B2 | 3/2008 | Saze |
| 7,343,398 B1 | 3/2008 | Lownsbrough |
| 7,343,413 B2 | 3/2008 | Gilde et al. |
| 7,346,664 B2 | 3/2008 | Wong et al. |
| 7,349,391 B2 | 3/2008 | Ben-Dor et al. |
| 7,349,405 B2 | 4/2008 | Deforche |
| 7,353,326 B2 | 4/2008 | Cho et al. |
| 7,355,977 B1 | 4/2008 | Li |
| 7,359,321 B1 | 4/2008 | Sindhu et al. |
| 7,373,438 B1 | 5/2008 | DeBergalis et al. |
| 7,376,772 B2 | 5/2008 | Fallon |
| 7,382,725 B1 | 6/2008 | Kakadia |
| 7,383,288 B2 | 6/2008 | Vladimir |
| 7,398,552 B2 | 7/2008 | Pardee et al. |
| 7,401,220 B2 | 7/2008 | Bolosky et al. |
| 7,403,542 B1 | 7/2008 | Thompson |
| 7,406,484 B1 | 7/2008 | Srinivasan et al. |
| 7,409,440 B1 | 8/2008 | Jacob |
| 7,411,957 B2 | 8/2008 | Stacy et al. |
| 7,415,034 B2 | 8/2008 | Muller et al. |
| 7,415,488 B1 | 8/2008 | Muth et al. |
| 7,415,608 B2 | 8/2008 | Bolosky et al. |
| 7,418,439 B2 | 8/2008 | Wong |
| 7,420,931 B2 | 9/2008 | Nanda et al. |
| 7,433,962 B2 | 10/2008 | Janssen et al. |
| 7,437,358 B2 | 10/2008 | Arrouye et al. |
| 7,440,982 B2 | 10/2008 | Lu et al. |
| 7,454,480 B2 | 11/2008 | Labio et al. |
| 7,457,313 B2 | 11/2008 | Patrick |
| 7,457,982 B2 | 11/2008 | Rajan |
| 7,467,158 B2 | 12/2008 | Marinescu |
| 7,475,122 B2 | 1/2009 | Azpitarte |
| 7,475,241 B2 | 1/2009 | Patel et al. |
| 7,477,796 B2 | 1/2009 | Sasaki et al. |
| 7,478,186 B1 | 1/2009 | Onufryk et al. |
| 7,490,162 B1 | 2/2009 | Masters |
| 7,493,398 B2 | 2/2009 | Bush |
| 7,496,367 B1 | 2/2009 | Ozturk et al. |
| 7,496,689 B2 | 2/2009 | Sharp et al. |
| 7,496,695 B2 | 2/2009 | Go et al. |
| 7,500,028 B2 | 3/2009 | Yamagishi |
| 7,500,243 B2 | 3/2009 | Huetsch et al. |
| 7,500,269 B2 | 3/2009 | Huotari et al. |
| 7,505,795 B1 | 3/2009 | Lim et al. |
| 7,509,322 B2 | 3/2009 | Miloushev et al. |
| 7,512,078 B2 | 3/2009 | Swain |
| 7,512,673 B2 | 3/2009 | Miloushev et al. |
| 7,512,721 B1 | 3/2009 | Olson |
| 7,516,492 B1 | 4/2009 | Nisbet et al. |
| 7,519,813 B1 | 4/2009 | Cox et al. |
| 7,526,541 B2 | 4/2009 | Roese et al. |
| 7,533,197 B2 | 5/2009 | Leonard et al. |
| 7,552,232 B2 | 6/2009 | Helmer, Jr. et al. |
| 7,555,608 B2 | 6/2009 | Naik |
| 7,558,197 B1 | 7/2009 | Sindhu et al. |
| 7,558,910 B2 | 7/2009 | Alverson et al. |
| 7,562,110 B2 | 7/2009 | Miloushev et al. |
| 7,571,168 B2 | 8/2009 | Bahar et al. |
| 7,571,299 B2 | 8/2009 | Loeb |
| 7,574,433 B2 | 8/2009 | Engel |
| 7,577,723 B2 | 8/2009 | Matsuda et al. |
| 7,580,971 B1 | 8/2009 | Gollapudi et al. |
| 7,587,471 B2 | 9/2009 | Yasuda et al. |
| 7,590,747 B2 | 9/2009 | Coates et al. |
| 7,590,753 B2 | 9/2009 | Wolde et al. |

(56) References Cited

U.S. PATENT DOCUMENTS

| | | | |
|---|---|---|---|
| 7,599,941 | B2 | 10/2009 | Bahar et al. |
| 7,610,307 | B2 | 10/2009 | Havewala et al. |
| 7,610,390 | B2 | 10/2009 | Yared et al. |
| 7,620,046 | B2 | 11/2009 | Ronciak et al. |
| 7,620,071 | B2 | 11/2009 | Makineni et al. |
| 7,621,162 | B2 | 11/2009 | Bartky |
| 7,624,109 | B2 | 11/2009 | Testardi |
| 7,624,424 | B2 | 11/2009 | Morita et al. |
| 7,639,883 | B2 | 12/2009 | Gill |
| 7,640,347 | B1 | 12/2009 | Sloat et al. |
| 7,644,109 | B2 | 1/2010 | Manley et al. |
| 7,644,137 | B2 | 1/2010 | Bozak et al. |
| 7,647,416 | B2 | 1/2010 | Chiang et al. |
| 7,653,699 | B1 | 1/2010 | Colgrove et al. |
| 7,656,788 | B2 | 2/2010 | Ma et al. |
| 7,657,659 | B1 | 2/2010 | Lambeth et al. |
| 7,660,916 | B2 | 2/2010 | Moskalev et al. |
| 7,668,166 | B1 | 2/2010 | Rekhter et al. |
| 7,668,727 | B2 | 2/2010 | Mitchell et al. |
| 7,668,851 | B2 | 2/2010 | Triplett |
| 7,680,836 | B2 | 3/2010 | Anderson et al. |
| 7,680,915 | B2 | 3/2010 | Still et al. |
| 7,684,423 | B2 | 3/2010 | Tripathi et al. |
| 7,685,126 | B2 | 3/2010 | Patel et al. |
| 7,685,177 | B1 | 3/2010 | Hagerstrom et al. |
| 7,689,596 | B2 | 3/2010 | Tsunoda |
| 7,694,082 | B2 | 4/2010 | Golding et al. |
| 7,698,458 | B1 | 4/2010 | Liu et al. |
| 7,706,261 | B2 | 4/2010 | Sun et al. |
| 7,710,989 | B2 | 5/2010 | Chew |
| 7,711,771 | B2 | 5/2010 | Kirnos et al. |
| 7,724,657 | B2 | 5/2010 | Rao et al. |
| 7,725,093 | B2 | 5/2010 | Sengupta et al. |
| 7,729,239 | B1 | 6/2010 | Aronov et al. |
| 7,734,603 | B1 | 6/2010 | McManis |
| 7,734,809 | B2 | 6/2010 | Joshi et al. |
| 7,735,099 | B1 | 6/2010 | Micalizzi, Jr. |
| 7,739,540 | B2 | 6/2010 | Akutsu et al. |
| 7,742,412 | B1 | 6/2010 | Medina |
| 7,743,031 | B1 | 6/2010 | Cameron et al. |
| 7,743,035 | B2 | 6/2010 | Chen et al. |
| 7,752,294 | B2 | 8/2010 | Srinivasan et al. |
| 7,778,187 | B2 | 8/2010 | Chaturvedi et al. |
| 7,784,093 | B2 | 8/2010 | Deng et al. |
| 7,788,335 | B2 | 8/2010 | Miloushev et al. |
| 7,801,978 | B1 | 9/2010 | Susai et al. |
| 7,809,691 | B1 | 10/2010 | Karmarkar et al. |
| 7,813,277 | B2 | 10/2010 | Okholm et al. |
| 7,818,299 | B1 | 10/2010 | Federwisch et al. |
| 7,822,839 | B1 | 10/2010 | Pruitt et al. |
| 7,822,939 | B1 | 10/2010 | Veprinsky et al. |
| 7,826,487 | B1 | 11/2010 | Mukerji et al. |
| 7,831,639 | B1 | 11/2010 | Panchbudhe et al. |
| 7,831,662 | B2 | 11/2010 | Clark et al. |
| 7,840,841 | B2 | 11/2010 | Huang et al. |
| 7,849,112 | B2 | 12/2010 | Mane et al. |
| 7,853,958 | B2 | 12/2010 | Mathew et al. |
| 7,861,085 | B1 | 12/2010 | Case et al. |
| 7,870,154 | B2 | 1/2011 | Shitomi et al. |
| 7,876,677 | B2 | 1/2011 | Cheshire |
| 7,877,511 | B1 | 1/2011 | Berger et al. |
| 7,877,524 | B1 | 1/2011 | Annem et al. |
| 7,885,970 | B2 | 2/2011 | Lacapra |
| 7,886,218 | B2 | 2/2011 | Watson |
| 7,889,734 | B1 | 2/2011 | Hendel et al. |
| 7,895,653 | B2 | 2/2011 | Calo et al. |
| 7,900,002 | B2 | 3/2011 | Lyon |
| 7,903,554 | B1 | 3/2011 | Manur et al. |
| 7,904,466 | B1 | 3/2011 | Valencia et al. |
| 7,908,245 | B2 | 3/2011 | Nakano et al. |
| 7,908,314 | B2 | 3/2011 | Yamaguchi et al. |
| 7,913,053 | B1 | 3/2011 | Newland |
| 7,916,728 | B1 | 3/2011 | Mimms |
| 7,925,908 | B2 | 4/2011 | Kim |
| 7,929,433 | B2 | 4/2011 | Husak et al. |
| 7,933,946 | B2 | 4/2011 | Livshits et al. |
| 7,936,772 | B2 | 5/2011 | Kashyap |
| 7,937,421 | B2 | 5/2011 | Mikesell et al. |
| 7,945,908 | B1 | 5/2011 | Waldspurger et al. |
| 7,953,085 | B2 | 5/2011 | Chang et al. |
| 7,953,701 | B2 | 5/2011 | Okitsu et al. |
| 7,958,222 | B1 | 6/2011 | Pruitt et al. |
| 7,958,347 | B1 | 6/2011 | Ferguson |
| 7,984,108 | B2 | 7/2011 | Landis et al. |
| 7,984,141 | B2 | 7/2011 | Gupta et al. |
| 7,984,500 | B1 | 7/2011 | Khanna et al. |
| 7,991,918 | B2 | 8/2011 | Jha et al. |
| 7,996,569 | B2 | 8/2011 | Aloni et al. |
| 8,005,953 | B2 | 8/2011 | Miloushev et al. |
| 8,006,016 | B2 | 8/2011 | Muller et al. |
| 8,010,756 | B1 | 8/2011 | Linde |
| 8,015,157 | B2 | 9/2011 | Kamei et al. |
| 8,024,443 | B1 | 9/2011 | Jacob |
| 8,046,547 | B1 | 10/2011 | Chatterjee et al. |
| 8,055,724 | B2 | 11/2011 | Amegadzie et al. |
| 8,064,342 | B2 | 11/2011 | Badger |
| 8,069,225 | B2 | 11/2011 | McCanne et al. |
| 8,077,620 | B2 | 12/2011 | Solomon et al. |
| 8,099,528 | B2 | 1/2012 | Millet et al. |
| 8,099,758 | B2 | 1/2012 | Schaefer et al. |
| 8,103,622 | B1 | 1/2012 | Karinta |
| 8,103,781 | B1 | 1/2012 | Wu et al. |
| 8,103,809 | B1 | 1/2012 | Michels et al. |
| 8,112,392 | B1 | 2/2012 | Bunnell et al. |
| 8,112,491 | B1 | 2/2012 | Michels et al. |
| 8,112,594 | B2 | 2/2012 | Giacomoni et al. |
| 8,117,244 | B2 | 2/2012 | Marinov et al. |
| 8,130,650 | B2 | 3/2012 | Allen, Jr. et al. |
| 8,155,128 | B2 | 4/2012 | Balyan et al. |
| 8,171,124 | B2 | 5/2012 | Kondamuru |
| 8,180,747 | B2 | 5/2012 | Marinkovic et al. |
| 8,190,769 | B1 | 5/2012 | Shukla et al. |
| 8,195,760 | B2 | 6/2012 | Lacapra et al. |
| 8,199,757 | B2 | 6/2012 | Pani et al. |
| 8,204,860 | B1 | 6/2012 | Ferguson et al. |
| 8,209,403 | B2 | 6/2012 | Szabo et al. |
| 8,233,380 | B2 | 7/2012 | Subramanian et al. |
| 8,239,354 | B2 | 8/2012 | Lacapra et al. |
| 8,248,928 | B1 | 8/2012 | Wang |
| 8,271,751 | B2 | 9/2012 | Hinrichs, Jr. |
| 8,279,865 | B2 | 10/2012 | Giacomoni et al. |
| 8,302,100 | B2 | 10/2012 | Deng et al. |
| 8,306,036 | B1 | 11/2012 | Bollay et al. |
| 8,306,948 | B2 | 11/2012 | Chou et al. |
| 8,321,908 | B2 | 11/2012 | Gai et al. |
| 8,326,798 | B1 | 12/2012 | Driscoll et al. |
| 8,346,993 | B2 | 1/2013 | Michels et al. |
| 8,351,333 | B2 | 1/2013 | Rao et al. |
| 8,351,600 | B2 | 1/2013 | Resch |
| 8,352,785 | B1 | 1/2013 | Nicklin et al. |
| 8,380,854 | B2 | 2/2013 | Szabo |
| 8,392,372 | B2 | 3/2013 | Ferguson et al. |
| 8,396,836 | B1 | 3/2013 | Ferguson et al. |
| 8,396,895 | B2 | 3/2013 | Miloushev et al. |
| 8,397,059 | B1 | 3/2013 | Ferguson |
| 8,400,919 | B1 | 3/2013 | Amdahl et al. |
| 8,417,681 | B1 | 4/2013 | Miloushev et al. |
| 8,417,746 | B1 | 4/2013 | Gillett, Jr. et al. |
| 8,417,817 | B1 | 4/2013 | Jacobs |
| 8,433,735 | B2 | 4/2013 | Lacapra |
| 8,447,871 | B1 | 5/2013 | Szabo |
| 8,447,884 | B1 | 5/2013 | Baumann |
| 8,448,234 | B2 | 5/2013 | Mondaeev et al. |
| 8,463,850 | B1 | 6/2013 | McCann |
| 8,464,265 | B2 | 6/2013 | Worley |
| 8,468,542 | B2 | 6/2013 | Jacobson et al. |
| 8,484,348 | B2 | 7/2013 | Subramanian et al. |
| 8,548,953 | B2 | 10/2013 | Wong et al. |
| 8,549,582 | B1 | 10/2013 | Andrews et al. |
| 8,601,000 | B1 | 12/2013 | Stefani et al. |
| 8,606,921 | B2 | 12/2013 | Vasquez et al. |
| 8,615,022 | B2 | 12/2013 | Harrison et al. |
| 8,665,868 | B2 | 3/2014 | Kay |
| 8,682,916 | B2 | 3/2014 | Wong et al. |

(56) References Cited

U.S. PATENT DOCUMENTS

| | | |
|---|---|---|
| 8,701,179 B1 | 4/2014 | Penno et al. |
| 8,745,266 B2 | 6/2014 | Agarwal et al. |
| 8,778,665 B2 | 7/2014 | Gilde et al. |
| 8,799,403 B2 | 8/2014 | Chan et al. |
| 8,804,504 B1 | 8/2014 | Chen |
| 8,819,109 B1 | 8/2014 | Krishnamurthy et al. |
| 8,819,768 B1 | 8/2014 | Koeten et al. |
| 8,830,874 B2 | 9/2014 | Cho et al. |
| 8,848,715 B2 | 9/2014 | Izenberg et al. |
| 8,880,632 B1 | 11/2014 | Michels et al. |
| 8,880,696 B1 | 11/2014 | Michels et al. |
| 8,954,492 B1 | 2/2015 | Lowell, Jr. |
| 8,984,178 B2 | 3/2015 | Michels et al. |
| 9,020,912 B1 | 4/2015 | Majee et al. |
| 9,032,113 B2 | 5/2015 | Conroy et al. |
| 9,497,614 B1 | 11/2016 | Ridel et al. |
| 2001/0007560 A1 | 7/2001 | Masuda et al. |
| 2001/0009554 A1 | 7/2001 | Katseff et al. |
| 2001/0023442 A1 | 9/2001 | Masters |
| 2001/0038629 A1 | 11/2001 | Shinohara |
| 2001/0042200 A1 | 11/2001 | Lamberton et al. |
| 2001/0047923 A1 | 11/2001 | Waller et al. |
| 2002/0012352 A1 | 1/2002 | Hansson et al. |
| 2002/0035537 A1 | 3/2002 | Waller et al. |
| 2002/0038360 A1 | 3/2002 | Andrews et al. |
| 2002/0049842 A1 | 4/2002 | Huetsch et al. |
| 2002/0059263 A1 | 5/2002 | Shima et al. |
| 2002/0059428 A1 | 5/2002 | Susai et al. |
| 2002/0065848 A1 | 5/2002 | Walker et al. |
| 2002/0072048 A1 | 6/2002 | Slattery et al. |
| 2002/0083067 A1 | 6/2002 | Tamayo et al. |
| 2002/0087571 A1 | 7/2002 | Stapel et al. |
| 2002/0087744 A1 | 7/2002 | Kitchin |
| 2002/0087887 A1 | 7/2002 | Busam et al. |
| 2002/0099829 A1 | 7/2002 | Richards et al. |
| 2002/0099842 A1 | 7/2002 | Jennings et al. |
| 2002/0103823 A1 | 8/2002 | Jackson et al. |
| 2002/0106263 A1 | 8/2002 | Winker |
| 2002/0112061 A1 | 8/2002 | Shih et al. |
| 2002/0120763 A1 | 8/2002 | Miloushev et al. |
| 2002/0138615 A1 | 9/2002 | Schmeling |
| 2002/0143819 A1 | 10/2002 | Han et al. |
| 2002/0143852 A1 | 10/2002 | Guo et al. |
| 2002/0143909 A1 | 10/2002 | Botz et al. |
| 2002/0143955 A1 | 10/2002 | Shimada et al. |
| 2002/0150253 A1 | 10/2002 | Brezak et al. |
| 2002/0156905 A1 | 10/2002 | Weissman |
| 2002/0156927 A1 | 10/2002 | Boucher et al. |
| 2002/0161911 A1 | 10/2002 | Pinckney, III et al. |
| 2002/0161913 A1 | 10/2002 | Gonzalez et al. |
| 2002/0162118 A1 | 10/2002 | Levy et al. |
| 2002/0174216 A1 | 11/2002 | Shorey et al. |
| 2002/0188753 A1 | 12/2002 | Tang et al. |
| 2002/0194112 A1 | 12/2002 | DePinto et al. |
| 2002/0194342 A1 | 12/2002 | Lu et al. |
| 2002/0198956 A1 | 12/2002 | Dunshea et al. |
| 2002/0198993 A1 | 12/2002 | Cudd et al. |
| 2003/0005172 A1 | 1/2003 | Chessell |
| 2003/0009528 A1 | 1/2003 | Sharif et al. |
| 2003/0012382 A1 | 1/2003 | Ferchichi et al. |
| 2003/0018450 A1 | 1/2003 | Carley |
| 2003/0018585 A1 | 1/2003 | Butler et al. |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0034905 A1 | 2/2003 | Anton et al. |
| 2003/0037070 A1 | 2/2003 | Marston |
| 2003/0046291 A1 | 3/2003 | Fascenda |
| 2003/0051045 A1 | 3/2003 | Connor |
| 2003/0055723 A1 | 3/2003 | English |
| 2003/0065951 A1 | 4/2003 | Igeta et al. |
| 2003/0065956 A1 | 4/2003 | Belapurkar et al. |
| 2003/0067930 A1 | 4/2003 | Salapura et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0072318 A1 | 4/2003 | Lam et al. |
| 2003/0074301 A1 | 4/2003 | Solomon |
| 2003/0076849 A1 | 4/2003 | Morgan |
| 2003/0086415 A1 | 5/2003 | Bernhard et al. |
| 2003/0088671 A1 | 5/2003 | Klinker et al. |
| 2003/0105846 A1 | 6/2003 | Zhao et al. |
| 2003/0105983 A1 | 6/2003 | Brakmo et al. |
| 2003/0108000 A1 | 6/2003 | Chaney et al. |
| 2003/0108002 A1 | 6/2003 | Chaney et al. |
| 2003/0108052 A1 | 6/2003 | Inoue et al. |
| 2003/0120948 A1 | 6/2003 | Schmidt et al. |
| 2003/0128708 A1 | 7/2003 | Inoue et al. |
| 2003/0130945 A1 | 7/2003 | Force |
| 2003/0139934 A1 | 7/2003 | Mandera |
| 2003/0145062 A1 | 7/2003 | Sharma et al. |
| 2003/0145233 A1 | 7/2003 | Poletto et al. |
| 2003/0156586 A1 | 8/2003 | Lee et al. |
| 2003/0159072 A1 | 8/2003 | Belinger et al. |
| 2003/0163576 A1 | 8/2003 | Janssen et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0189936 A1 | 10/2003 | Terrell et al. |
| 2003/0191812 A1 | 10/2003 | Agarwalla et al. |
| 2003/0195813 A1 | 10/2003 | Pallister et al. |
| 2003/0200207 A1 | 10/2003 | Dickinson |
| 2003/0204635 A1 | 10/2003 | Ko et al. |
| 2003/0204636 A1 | 10/2003 | Greenblat et al. |
| 2003/0212954 A1 | 11/2003 | Patrudu |
| 2003/0220835 A1 | 11/2003 | Barnes, Jr. |
| 2003/0225485 A1 | 12/2003 | Fritz et al. |
| 2003/0229665 A1 | 12/2003 | Ryman |
| 2003/0236995 A1 | 12/2003 | Fretwell, Jr. |
| 2004/0003266 A1 | 1/2004 | Moshir et al. |
| 2004/0003287 A1 | 1/2004 | Zissimopoulos et al. |
| 2004/0006575 A1 | 1/2004 | Visharam et al. |
| 2004/0006591 A1 | 1/2004 | Matsui et al. |
| 2004/0010654 A1 | 1/2004 | Yasuda et al. |
| 2004/0015783 A1 | 1/2004 | Lennon et al. |
| 2004/0017825 A1 | 1/2004 | Stanwood et al. |
| 2004/0028043 A1 | 2/2004 | Maveli et al. |
| 2004/0030627 A1 | 2/2004 | Sedukhin |
| 2004/0030740 A1 | 2/2004 | Stelting |
| 2004/0030857 A1 | 2/2004 | Krakirian et al. |
| 2004/0032830 A1 | 2/2004 | Bly et al. |
| 2004/0043758 A1 | 3/2004 | Sorvari et al. |
| 2004/0044705 A1 | 3/2004 | Stager et al. |
| 2004/0054748 A1 | 3/2004 | Ackaouy et al. |
| 2004/0059789 A1 | 3/2004 | Shum |
| 2004/0062245 A1 | 4/2004 | Sharp et al. |
| 2004/0064544 A1 | 4/2004 | Barsness et al. |
| 2004/0064554 A1 | 4/2004 | Kuno et al. |
| 2004/0072569 A1 | 4/2004 | Omae et al. |
| 2004/0093361 A1 | 5/2004 | Therrien et al. |
| 2004/0093474 A1 | 5/2004 | Lin et al. |
| 2004/0098595 A1 | 5/2004 | Aupperle et al. |
| 2004/0103283 A1 | 5/2004 | Hornak |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0122926 A1 | 6/2004 | Moore et al. |
| 2004/0123277 A1 | 6/2004 | Schrader et al. |
| 2004/0133577 A1 | 7/2004 | Miloushev et al. |
| 2004/0133605 A1 | 7/2004 | Chang et al. |
| 2004/0133606 A1 | 7/2004 | Miloushev et al. |
| 2004/0138858 A1 | 7/2004 | Carley |
| 2004/0139355 A1 | 7/2004 | Axel et al. |
| 2004/0148380 A1 | 7/2004 | Meyer et al. |
| 2004/0151186 A1 | 8/2004 | Akama |
| 2004/0153479 A1 | 8/2004 | Mikesell et al. |
| 2004/0167967 A1 | 8/2004 | Bastian et al. |
| 2004/0192312 A1 | 9/2004 | Li et al. |
| 2004/0199547 A1 | 10/2004 | Winter et al. |
| 2004/0199762 A1 | 10/2004 | Carlson et al. |
| 2004/0202161 A1 | 10/2004 | Stachura et al. |
| 2004/0210731 A1 | 10/2004 | Chatterjee et al. |
| 2004/0213156 A1 | 10/2004 | Smallwood et al. |

(56) References Cited

U.S. PATENT DOCUMENTS

| | | |
|---|---|---|
| 2004/0215665 A1 | 10/2004 | Edgar et al. |
| 2004/0236798 A1 | 11/2004 | Srinivasan et al. |
| 2004/0236826 A1 | 11/2004 | Harville et al. |
| 2004/0240447 A1 | 12/2004 | Dorbolo |
| 2004/0249881 A1 | 12/2004 | Jha et al. |
| 2004/0249948 A1 | 12/2004 | Sethi et al. |
| 2004/0264472 A1 | 12/2004 | Oliver et al. |
| 2004/0264481 A1 | 12/2004 | Darling et al. |
| 2004/0267897 A1 | 12/2004 | Hill et al. |
| 2004/0267920 A1 | 12/2004 | Hydrie et al. |
| 2004/0267948 A1 | 12/2004 | Oliver et al. |
| 2004/0268358 A1 | 12/2004 | Darling et al. |
| 2005/0004887 A1 | 1/2005 | Igakura et al. |
| 2005/0007991 A1 | 1/2005 | Ton et al. |
| 2005/0008017 A1 | 1/2005 | Datta et al. |
| 2005/0021703 A1 | 1/2005 | Cherry et al. |
| 2005/0021736 A1 | 1/2005 | Carusi et al. |
| 2005/0027841 A1 | 2/2005 | Rolfe |
| 2005/0027862 A1 | 2/2005 | Nguyen et al. |
| 2005/0027869 A1 | 2/2005 | Johnson |
| 2005/0044158 A1 | 2/2005 | Malik |
| 2005/0044213 A1 | 2/2005 | Kobayashi et al. |
| 2005/0050107 A1 | 3/2005 | Mane et al. |
| 2005/0050364 A1 | 3/2005 | Feng |
| 2005/0052440 A1 | 3/2005 | Kim et al. |
| 2005/0055435 A1 | 3/2005 | Gbadegesin et al. |
| 2005/0078604 A1 | 4/2005 | Yim |
| 2005/0083952 A1 | 4/2005 | Swain |
| 2005/0091214 A1 | 4/2005 | Probed et al. |
| 2005/0091390 A1 | 4/2005 | Helmer et al. |
| 2005/0100011 A1 | 5/2005 | Chiruvolu et al. |
| 2005/0108575 A1 | 5/2005 | Yung |
| 2005/0114559 A1 | 5/2005 | Miller |
| 2005/0114701 A1 | 5/2005 | Atkins et al. |
| 2005/0117589 A1 | 6/2005 | Douady et al. |
| 2005/0122977 A1 | 6/2005 | Lieberman |
| 2005/0141427 A1 | 6/2005 | Bartky |
| 2005/0154837 A1 | 7/2005 | Keohane et al. |
| 2005/0160161 A1 | 7/2005 | Barrett et al. |
| 2005/0160243 A1 | 7/2005 | Lubbers et al. |
| 2005/0165656 A1 | 7/2005 | Frederick et al. |
| 2005/0174944 A1 | 8/2005 | Legault et al. |
| 2005/0175013 A1 | 8/2005 | Le Pennec et al. |
| 2005/0175014 A1 | 8/2005 | Patrick |
| 2005/0187866 A1 | 8/2005 | Lee |
| 2005/0188220 A1 | 8/2005 | Nilsson et al. |
| 2005/0198234 A1 | 9/2005 | Leib et al. |
| 2005/0198310 A1 | 9/2005 | Kim et al. |
| 2005/0198501 A1 | 9/2005 | Andreev et al. |
| 2005/0213570 A1 | 9/2005 | Stacy et al. |
| 2005/0213587 A1 | 9/2005 | Cho et al. |
| 2005/0226234 A1 | 10/2005 | Sano et al. |
| 2005/0234928 A1 | 10/2005 | Shkvarchuk et al. |
| 2005/0240664 A1 | 10/2005 | Chen et al. |
| 2005/0246393 A1 | 11/2005 | Coates et al. |
| 2005/0254490 A1 | 11/2005 | Gallatin et al. |
| 2005/0256806 A1 | 11/2005 | Tien et al. |
| 2005/0262238 A1 | 11/2005 | Reeves et al. |
| 2005/0267941 A1 | 12/2005 | Addante |
| 2005/0273456 A1 | 12/2005 | Revanuru et al. |
| 2005/0281196 A1 | 12/2005 | Tornetta et al. |
| 2005/0289111 A1 | 12/2005 | Tribble et al. |
| 2006/0007928 A1 | 1/2006 | Sangillo |
| 2006/0010502 A1 | 1/2006 | Mimatsu et al. |
| 2006/0031374 A1 | 2/2006 | Lu et al. |
| 2006/0031520 A1 | 2/2006 | Bedekar et al. |
| 2006/0031778 A1 | 2/2006 | Goodwin et al. |
| 2006/0036764 A1 | 2/2006 | Yokota et al. |
| 2006/0045089 A1 | 3/2006 | Bacher et al. |
| 2006/0045096 A1 | 3/2006 | Farmer et al. |
| 2006/0047785 A1 | 3/2006 | Wang et al. |
| 2006/0059267 A1 | 3/2006 | Cugi et al. |
| 2006/0067349 A1 | 3/2006 | Ronciak et al. |
| 2006/0074922 A1 | 4/2006 | Nishimura |
| 2006/0075475 A1 | 4/2006 | Boulos et al. |
| 2006/0077902 A1 | 4/2006 | Kannan et al. |
| 2006/0077986 A1 | 4/2006 | Rune |
| 2006/0080353 A1 | 4/2006 | Miloushev et al. |
| 2006/0100752 A1 | 5/2006 | Kim et al. |
| 2006/0104303 A1 | 5/2006 | Makineni et al. |
| 2006/0106882 A1 | 5/2006 | Douceur et al. |
| 2006/0112176 A1 | 5/2006 | Liu et al. |
| 2006/0112272 A1 | 5/2006 | Morioka et al. |
| 2006/0112367 A1 | 5/2006 | Harris |
| 2006/0123062 A1 | 6/2006 | Bobbitt et al. |
| 2006/0123210 A1 | 6/2006 | Pritchett et al. |
| 2006/0129684 A1 | 6/2006 | Datta |
| 2006/0130133 A1 | 6/2006 | Andreev et al. |
| 2006/0133374 A1 | 6/2006 | Sekiguchi |
| 2006/0135198 A1 | 6/2006 | Lee |
| 2006/0140193 A1 | 6/2006 | Kakani et al. |
| 2006/0153201 A1 | 7/2006 | Hepper et al. |
| 2006/0156416 A1 | 7/2006 | Huotari et al. |
| 2006/0161577 A1 | 7/2006 | Kulkarni et al. |
| 2006/0167838 A1 | 7/2006 | Lacapra |
| 2006/0171365 A1 | 8/2006 | Borella |
| 2006/0174324 A1 | 8/2006 | Zur et al. |
| 2006/0179261 A1 | 8/2006 | Rajan |
| 2006/0184589 A1 | 8/2006 | Lees et al. |
| 2006/0184647 A1 | 8/2006 | Dixit et al. |
| 2006/0200470 A1 | 9/2006 | Lacapra et al. |
| 2006/0206547 A1 | 9/2006 | Kulkarni et al. |
| 2006/0209669 A1 | 9/2006 | Nishio |
| 2006/0209853 A1 | 9/2006 | Hidaka et al. |
| 2006/0218135 A1 | 9/2006 | Bisson et al. |
| 2006/0221832 A1 | 10/2006 | Muller et al. |
| 2006/0221835 A1 | 10/2006 | Sweeney |
| 2006/0224636 A1 | 10/2006 | Kathuria et al. |
| 2006/0224687 A1 | 10/2006 | Popkin et al. |
| 2006/0224820 A1 | 10/2006 | Cho et al. |
| 2006/0230148 A1 | 10/2006 | Forecast et al. |
| 2006/0230265 A1 | 10/2006 | Krishna |
| 2006/0233106 A1 | 10/2006 | Achlioptas et al. |
| 2006/0235996 A1 | 10/2006 | Wolde et al. |
| 2006/0235998 A1 | 10/2006 | Stechler et al. |
| 2006/0242179 A1 | 10/2006 | Chen et al. |
| 2006/0242300 A1 | 10/2006 | Yumoto et al. |
| 2006/0259320 A1 | 11/2006 | LaSalle et al. |
| 2006/0259949 A1 | 11/2006 | Schaefer et al. |
| 2006/0268692 A1 | 11/2006 | Wright et al. |
| 2006/0268704 A1 | 11/2006 | Ansari et al. |
| 2006/0268932 A1 | 11/2006 | Singh et al. |
| 2006/0270341 A1 | 11/2006 | Kim et al. |
| 2006/0271598 A1 | 11/2006 | Wong et al. |
| 2006/0277225 A1 | 12/2006 | Mark et al. |
| 2006/0282442 A1 | 12/2006 | Lennon et al. |
| 2006/0282461 A1 | 12/2006 | Marinescu |
| 2006/0282471 A1 | 12/2006 | Mark et al. |
| 2006/0288128 A1 | 12/2006 | Moskalev et al. |
| 2007/0005807 A1 | 1/2007 | Wong |
| 2007/0006293 A1 | 1/2007 | Balakrishnan et al. |
| 2007/0016613 A1 | 1/2007 | Foresti et al. |
| 2007/0016662 A1 | 1/2007 | Desai et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0038994 A1 | 2/2007 | Davis et al. |
| 2007/0058670 A1 | 3/2007 | Konduru et al. |
| 2007/0061441 A1 | 3/2007 | Landis et al. |
| 2007/0064661 A1 | 3/2007 | Sood et al. |
| 2007/0083646 A1 | 4/2007 | Miller et al. |
| 2007/0088702 A1 | 4/2007 | Fridella et al. |
| 2007/0088822 A1 | 4/2007 | Coile et al. |
| 2007/0106796 A1 | 5/2007 | Kudo et al. |
| 2007/0107048 A1 | 5/2007 | Halls et al. |
| 2007/0112775 A1 | 5/2007 | Ackerman |
| 2007/0118879 A1 | 5/2007 | Yeun |
| 2007/0124415 A1 | 5/2007 | Lev-Ran et al. |
| 2007/0124502 A1 | 5/2007 | Li |
| 2007/0130255 A1 | 6/2007 | Wolovitz et al. |
| 2007/0136308 A1 | 6/2007 | Tsirigotis et al. |
| 2007/0139227 A1 | 6/2007 | Speirs et al. |
| 2007/0147246 A1 | 6/2007 | Hurley |

(56) References Cited

U.S. PATENT DOCUMENTS

| | | |
|---|---|---|
| 2007/0162619 A1 | 7/2007 | Aloni et al. |
| 2007/0162891 A1 | 7/2007 | Burner et al. |
| 2007/0165622 A1 | 7/2007 | O'Rourke |
| 2007/0168320 A1 | 7/2007 | Borthakur et al. |
| 2007/0174491 A1 | 7/2007 | Still et al. |
| 2007/0180314 A1 | 8/2007 | Kawashima et al. |
| 2007/0192543 A1 | 8/2007 | Naik |
| 2007/0208748 A1 | 9/2007 | Li |
| 2007/0209075 A1 | 9/2007 | Coffman |
| 2007/0220598 A1 | 9/2007 | Salowey et al. |
| 2007/0233809 A1 | 10/2007 | Brownell et al. |
| 2007/0233826 A1 | 10/2007 | Tindal et al. |
| 2007/0250560 A1 | 10/2007 | Wein et al. |
| 2007/0260830 A1 | 11/2007 | Faibish et al. |
| 2007/0274314 A1 | 11/2007 | Werber |
| 2007/0297410 A1 | 12/2007 | Yoon et al. |
| 2007/0297551 A1 | 12/2007 | Choi |
| 2008/0004022 A1 | 1/2008 | Johannesson et al. |
| 2008/0010372 A1 | 1/2008 | Khendouri et al. |
| 2008/0022059 A1 | 1/2008 | Zimmerer et al. |
| 2008/0025297 A1 | 1/2008 | Kashyap |
| 2008/0031258 A1 | 2/2008 | Acharya et al. |
| 2008/0034136 A1 | 2/2008 | Ulenas |
| 2008/0046432 A1 | 2/2008 | Anderson et al. |
| 2008/0070575 A1 | 3/2008 | Claussen et al. |
| 2008/0072303 A1 | 3/2008 | Syed |
| 2008/0114718 A1 | 5/2008 | Anderson et al. |
| 2008/0120370 A1 | 5/2008 | Chan et al. |
| 2008/0126509 A1 | 5/2008 | Subramanian et al. |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0159145 A1 | 7/2008 | Muthukrishnan et al. |
| 2008/0178278 A1 | 7/2008 | Grinstein et al. |
| 2008/0184248 A1 | 7/2008 | Barua et al. |
| 2008/0189468 A1 | 8/2008 | Schmidt et al. |
| 2008/0201599 A1 | 8/2008 | Ferraiolo et al. |
| 2008/0201772 A1 | 8/2008 | Mondaeev et al. |
| 2008/0205613 A1 | 8/2008 | Lopez |
| 2008/0208917 A1 | 8/2008 | Smoot et al. |
| 2008/0208933 A1 | 8/2008 | Lyon |
| 2008/0209073 A1 | 8/2008 | Tang |
| 2008/0215836 A1 | 9/2008 | Sutoh et al. |
| 2008/0219279 A1 | 9/2008 | Chew |
| 2008/0222223 A1 | 9/2008 | Srinivasan et al. |
| 2008/0222646 A1 | 9/2008 | Sigal et al. |
| 2008/0225710 A1 | 9/2008 | Raja et al. |
| 2008/0229415 A1 | 9/2008 | Kapoor et al. |
| 2008/0243769 A1 | 10/2008 | Arbour et al. |
| 2008/0253395 A1 | 10/2008 | Pandya |
| 2008/0256224 A1 | 10/2008 | Kaji et al. |
| 2008/0263401 A1 | 10/2008 | Stenzel |
| 2008/0270578 A1 | 10/2008 | Zhang et al. |
| 2008/0279200 A1 | 11/2008 | Shatzkamer et al. |
| 2008/0281908 A1 | 11/2008 | McCanne et al. |
| 2008/0282047 A1 | 11/2008 | Arakawa et al. |
| 2008/0282354 A1 | 11/2008 | Wobber et al. |
| 2008/0285578 A1 | 11/2008 | DeLay et al. |
| 2008/0288661 A1 | 11/2008 | Galles |
| 2008/0294446 A1 | 11/2008 | Guo et al. |
| 2008/0301760 A1 | 12/2008 | Lim |
| 2009/0003204 A1 | 1/2009 | Okholm et al. |
| 2009/0007162 A1 | 1/2009 | Sheehan |
| 2009/0007266 A1 | 1/2009 | Wu et al. |
| 2009/0013138 A1 | 1/2009 | Sudhakar |
| 2009/0016217 A1 | 1/2009 | Kashyap |
| 2009/0019535 A1 | 1/2009 | Mishra et al. |
| 2009/0028337 A1 | 1/2009 | Balabine et al. |
| 2009/0037500 A1 | 2/2009 | Kirshenbaum |
| 2009/0037975 A1 | 2/2009 | Ishikawa et al. |
| 2009/0041230 A1 | 2/2009 | Williams |
| 2009/0049230 A1 | 2/2009 | Pandya |
| 2009/0055507 A1 | 2/2009 | Oeda |
| 2009/0055607 A1 | 2/2009 | Schack et al. |
| 2009/0070617 A1 | 3/2009 | Arimilli et al. |
| 2009/0077097 A1 | 3/2009 | Lacapra |
| 2009/0077619 A1 | 3/2009 | Boyce |
| 2009/0080440 A1 | 3/2009 | Balyan et al. |
| 2009/0089344 A1 | 4/2009 | Brown et al. |
| 2009/0089619 A1 | 4/2009 | Huang et al. |
| 2009/0094252 A1 | 4/2009 | Wong et al. |
| 2009/0094311 A1 | 4/2009 | Awadallah et al. |
| 2009/0094610 A1 | 4/2009 | Sukirya |
| 2009/0106255 A1 | 4/2009 | Lacapra et al. |
| 2009/0106263 A1 | 4/2009 | Khalid et al. |
| 2009/0106413 A1 | 4/2009 | Salo et al. |
| 2009/0119504 A1 | 5/2009 | van Os et al. |
| 2009/0125496 A1 | 5/2009 | Wexler et al. |
| 2009/0125532 A1 | 5/2009 | Wexler et al. |
| 2009/0125625 A1 | 5/2009 | Shim et al. |
| 2009/0125955 A1 | 5/2009 | DeLorme |
| 2009/0129393 A1 | 5/2009 | Okuno et al. |
| 2009/0132616 A1 | 5/2009 | Winter et al. |
| 2009/0138314 A1 | 5/2009 | Bruce |
| 2009/0138749 A1 | 5/2009 | Moll et al. |
| 2009/0141891 A1 | 6/2009 | Boyen et al. |
| 2009/0154459 A1 | 6/2009 | Husak et al. |
| 2009/0157678 A1 | 6/2009 | Turk |
| 2009/0161542 A1 | 6/2009 | Ho |
| 2009/0187915 A1 | 7/2009 | Chew et al. |
| 2009/0193513 A1 | 7/2009 | Agarwal et al. |
| 2009/0196282 A1 | 8/2009 | Fellman et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0210875 A1 | 8/2009 | Bolles et al. |
| 2009/0217163 A1 | 8/2009 | Jaroker |
| 2009/0217386 A1 | 8/2009 | Schneider |
| 2009/0222598 A1 | 9/2009 | Hayden |
| 2009/0228956 A1 | 9/2009 | He et al. |
| 2009/0240705 A1 | 9/2009 | Miloushev et al. |
| 2009/0240899 A1 | 9/2009 | Akagawa et al. |
| 2009/0241176 A1 | 9/2009 | Beletski et al. |
| 2009/0248911 A1 | 10/2009 | Conroy et al. |
| 2009/0265396 A1 | 10/2009 | Ram et al. |
| 2009/0265467 A1 | 10/2009 | Peles |
| 2009/0279559 A1 | 11/2009 | Wong et al. |
| 2009/0287935 A1 | 11/2009 | Aull et al. |
| 2009/0292957 A1 | 11/2009 | Bower et al. |
| 2009/0296624 A1 | 12/2009 | Ryu et al. |
| 2009/0300161 A1 | 12/2009 | Pruitt et al. |
| 2009/0300407 A1 | 12/2009 | Kamath et al. |
| 2009/0313503 A1 | 12/2009 | Atluri et al. |
| 2009/0316708 A1 | 12/2009 | Yahyaoui et al. |
| 2009/0319600 A1 | 12/2009 | Sedan et al. |
| 2010/0011434 A1 | 1/2010 | Kay |
| 2010/0017643 A1 | 1/2010 | Baba et al. |
| 2010/0023582 A1 | 1/2010 | Pedersen et al. |
| 2010/0030777 A1 | 2/2010 | Panwar et al. |
| 2010/0042743 A1 | 2/2010 | Jeon et al. |
| 2010/0061232 A1 | 3/2010 | Zhou et al. |
| 2010/0064001 A1 | 3/2010 | Daily |
| 2010/0070476 A1 | 3/2010 | O'Keefe et al. |
| 2010/0071048 A1 | 3/2010 | Novak et al. |
| 2010/0082542 A1 | 4/2010 | Feng et al. |
| 2010/0082849 A1 | 4/2010 | Millet et al. |
| 2010/0085875 A1 | 4/2010 | Solomon et al. |
| 2010/0093318 A1 | 4/2010 | Zhu et al. |
| 2010/0094945 A1 | 4/2010 | Chan et al. |
| 2010/0115236 A1 | 5/2010 | Bataineh et al. |
| 2010/0122091 A1 | 5/2010 | Huang et al. |
| 2010/0122248 A1 | 5/2010 | Robinson et al. |
| 2010/0131654 A1 | 5/2010 | Malakapalli et al. |
| 2010/0150154 A1 | 6/2010 | Viger et al. |
| 2010/0154031 A1 | 6/2010 | Montemurro et al. |
| 2010/0165877 A1 | 7/2010 | Shukla et al. |
| 2010/0179984 A1 | 7/2010 | Sebastian |
| 2010/0188976 A1 | 7/2010 | Rahman et al. |
| 2010/0189052 A1 | 7/2010 | Kavanagh et al. |
| 2010/0199042 A1 | 8/2010 | Bates et al. |
| 2010/0205206 A1 | 8/2010 | Rabines et al. |
| 2010/0211547 A1 | 8/2010 | Kamei et al. |
| 2010/0228819 A1 | 9/2010 | Wei |

(56) References Cited

U.S. PATENT DOCUMENTS

| | | |
|---|---|---|
| 2010/0242092 A1 | 9/2010 | Harris et al. |
| 2010/0250497 A1 | 9/2010 | Redlich et al. |
| 2010/0251330 A1 | 9/2010 | Kroeselberg et al. |
| 2010/0272117 A1 | 10/2010 | Wu |
| 2010/0274772 A1 | 10/2010 | Samuels |
| 2010/0279733 A1 | 11/2010 | Karsten et al. |
| 2010/0299451 A1 | 11/2010 | Yigang et al. |
| 2010/0306169 A1 | 12/2010 | Pishevar et al. |
| 2010/0322250 A1 | 12/2010 | Shetty et al. |
| 2010/0325257 A1 | 12/2010 | Goel et al. |
| 2010/0325277 A1 | 12/2010 | Muthiah et al. |
| 2010/0325634 A1 | 12/2010 | Ichikawa et al. |
| 2011/0040889 A1 | 2/2011 | Garrett et al. |
| 2011/0047620 A1 | 2/2011 | Mahaffey et al. |
| 2011/0055921 A1 | 3/2011 | Narayanaswamy et al. |
| 2011/0066718 A1 | 3/2011 | Susai et al. |
| 2011/0066736 A1 | 3/2011 | Mitchell et al. |
| 2011/0072321 A1 | 3/2011 | Dhuse |
| 2011/0083185 A1 | 4/2011 | Sheleheda et al. |
| 2011/0087696 A1 | 4/2011 | Lacapra |
| 2011/0093471 A1 | 4/2011 | Brockway et al. |
| 2011/0098087 A1 | 4/2011 | Tseng |
| 2011/0107077 A1 | 5/2011 | Henderson et al. |
| 2011/0107112 A1 | 5/2011 | Resch |
| 2011/0119234 A1 | 5/2011 | Schack et al. |
| 2011/0153822 A1 | 6/2011 | Rajan et al. |
| 2011/0154443 A1 | 6/2011 | Thakur et al. |
| 2011/0173295 A1 | 7/2011 | Bakke et al. |
| 2011/0184733 A1 | 7/2011 | Yu et al. |
| 2011/0185082 A1 | 7/2011 | Thompson |
| 2011/0202676 A1 | 8/2011 | Craig et al. |
| 2011/0228781 A1 | 9/2011 | Izenberg et al. |
| 2011/0246800 A1 | 10/2011 | Accpadi et al. |
| 2011/0255537 A1 | 10/2011 | Ramasamy et al. |
| 2011/0273984 A1 | 11/2011 | Hsu et al. |
| 2011/0282997 A1 | 11/2011 | Prince et al. |
| 2011/0296411 A1 | 12/2011 | Tang et al. |
| 2011/0314178 A1 | 12/2011 | Kanode et al. |
| 2011/0320882 A1 | 12/2011 | Beaty et al. |
| 2011/0321122 A1 | 12/2011 | Mwangi et al. |
| 2012/0007239 A1 | 1/2012 | Kolics et al. |
| 2012/0016994 A1 | 1/2012 | Nakamura et al. |
| 2012/0039341 A1 | 2/2012 | Latif et al. |
| 2012/0041965 A1 | 2/2012 | Vasquez et al. |
| 2012/0042115 A1 | 2/2012 | Young |
| 2012/0063314 A1 | 3/2012 | Pignataro et al. |
| 2012/0066489 A1 | 3/2012 | Ozaki et al. |
| 2012/0078856 A1 | 3/2012 | Linde |
| 2012/0101952 A1 | 4/2012 | Raleigh et al. |
| 2012/0117028 A1 | 5/2012 | Gold et al. |
| 2012/0127998 A1 | 5/2012 | Assarpour |
| 2012/0144229 A1 | 6/2012 | Nadolski |
| 2012/0150699 A1 | 6/2012 | Trapp et al. |
| 2012/0150805 A1 | 6/2012 | Pafumi et al. |
| 2012/0191800 A1 | 7/2012 | Michels et al. |
| 2012/0191847 A1 | 7/2012 | Nas et al. |
| 2012/0195273 A1 | 8/2012 | Iwamura et al. |
| 2012/0224531 A1 | 9/2012 | Karuturi et al. |
| 2012/0246637 A1 | 9/2012 | Kreeger et al. |
| 2012/0257506 A1 | 10/2012 | Bazlamacci |
| 2012/0258766 A1 | 10/2012 | Cho et al. |
| 2012/0311153 A1 | 12/2012 | Morgan |
| 2012/0317266 A1 | 12/2012 | Abbott |
| 2013/0029726 A1 | 1/2013 | Berionne et al. |
| 2013/0031060 A1 | 1/2013 | Lowery et al. |
| 2013/0058225 A1 | 3/2013 | Casado et al. |
| 2013/0058229 A1 | 3/2013 | Casado et al. |
| 2013/0058252 A1 | 3/2013 | Casado et al. |
| 2013/0058358 A1 | 3/2013 | Fulton |
| 2013/0091002 A1 | 4/2013 | Christie et al. |
| 2013/0198322 A1 | 8/2013 | Oran et al. |
| 2013/0205361 A1 | 8/2013 | Narayanaswamy et al. |
| 2013/0238472 A1 | 9/2013 | Fan et al. |
| 2013/0250777 A1 | 9/2013 | Ziegler |
| 2013/0336122 A1 | 12/2013 | Baruah et al. |
| 2014/0032695 A1 | 1/2014 | Michels et al. |
| 2014/0040478 A1 | 2/2014 | Hsu et al. |
| 2014/0059678 A1 | 2/2014 | Parker |
| 2014/0071895 A1 | 3/2014 | Bane et al. |
| 2014/0095661 A1 | 4/2014 | Knowles et al. |
| 2014/0099945 A1 | 4/2014 | Singh et al. |
| 2014/0105069 A1 | 4/2014 | Potnuru |
| 2014/0162705 A1 | 6/2014 | De Wit et al. |
| 2014/0171089 A1 | 6/2014 | Janakiraman et al. |
| 2014/0185442 A1 | 7/2014 | Newman et al. |
| 2014/0187199 A1 | 7/2014 | Yan et al. |
| 2014/0226666 A1 | 8/2014 | Narasimhan et al. |
| 2014/0269484 A1 | 9/2014 | Dankberg et al. |
| 2014/0286316 A1 | 9/2014 | Park et al. |
| 2014/0301207 A1 | 10/2014 | Durand et al. |
| 2014/0317404 A1 | 10/2014 | Carlson et al. |
| 2014/0372599 A1 | 12/2014 | Gutt et al. |
| 2016/0127227 A1 | 5/2016 | Lee |

FOREIGN PATENT DOCUMENTS

| | | |
|---|---|---|
| CA | 2512312 | 7/2004 |
| EP | 0605088 | 6/1994 |
| EP | 0738970 | 10/1996 |
| EP | 0744850 A2 | 11/1996 |
| EP | 1081918 | 8/2000 |
| EP | 1813084 A1 | 8/2007 |
| JP | 63010250 | 1/1988 |
| JP | 06-332782 | 2/1994 |
| JP | 6205006 | 7/1994 |
| JP | 8021924 | 3/1996 |
| JP | 08-328760 | 12/1996 |
| JP | 08-339355 | 12/1996 |
| JP | 9016510 | 1/1997 |
| JP | 11282741 | 10/1999 |
| NZ | 566291 | 12/2008 |
| WO | WO 91/14326 | 9/1991 |
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/64967 | 12/1999 |
| WO | WO 00/04422 | 1/2000 |
| WO | WO 00/04458 | 1/2000 |
| WO | WO 0058870 | 3/2000 |
| WO | WO 200239696 | 5/2002 |
| WO | WO 2002056181 | 7/2002 |
| WO | WO 2004061605 | 7/2004 |
| WO | WO 2004079930 | 9/2004 |
| WO | WO 2006/055494 | 5/2006 |
| WO | WO 2006091040 | 8/2006 |
| WO | WO 2008/093174 | 8/2008 |
| WO | WO 2008130983 | 10/2008 |
| WO | WO 2008147973 | 12/2008 |
| WO | WO 2009158680 | 12/2009 |

OTHER PUBLICATIONS

"A Storage Architecture Guide," Second Edition, 2001, Auspex Systems, Inc., www.auspex.com, last accessed on Dec. 30, 2002.

"Cavium Networks Product Selector Guide—Single & Multi-Core MIPS Processors, Security Processors and Accelerator Boards—Spring 2008," (2008) pp. 1-44, Cavium Networks, Mountain View, CA, US.

"Comtech AHA Announces 3.0 Gbps GZIP Compression/Decompression Accelerator AHA362-PCIX offers high-speed GZIP compression and decompression," www.aha.com, Apr. 20, 2005, pp. 1-2, Comtech AHA Corporation, Moscow, ID, USA.

"Comtech AHA Announces GZIP Compression and Decompression IC Offers the highest speed and compression ratio performance in hardware on the market," www.aha.com, Jun. 26, 2007, pp. 1-2, Comtech AHA Corporation, Moscow, ID, USA.

"CSA Persistent File System Technology," A White Paper, Jan. 1, 1999, p. 1-3, http://www.cosoa.com/white_papers/ pfs.php, Colorado Software Architecture, Inc.

(56) References Cited

OTHER PUBLICATIONS

"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).

"Distributed File System: A Logical View of Physical Storage: White Paper," 1999, Microsoft Corp., www.microsoft.com, <http://www.eu.microsoft.com/TechNet/prodtechnol/windows2000serv/maintain/DFS nt95>, pp. 1-26, last accessed on Dec. 20, 2002.

"DMA and Interrupt Handling," EventHelix.com; www.eventhelix.com/RealtimeMantra—last accessed Jan. 29, 2010.

"Gigabit Ethernet/PCI Network Interface Card; Host/NIC Software Interface Definition," Jul. 1999, pp. 1-80, Revision 12.4.13, P/N 020001, Alteon WebSystems, Inc., San Jose, California.

"Market Research & Releases, CMPP PoC documentation", last accessed Mar. 29, 2010, (http:/Imainstreet/sites/PD/ Teams/ProdMgmt/MarketResearch/Universal).

"Market Research & Releases, Solstice Diameter Requirements", last accessed Mar. 29, 2010, (http:)/mainstreet/ sites/PD/Teams/ProdMgmt/MarketResearch/Unisversal).

"NERSC Tutorials: I/O on the Cray T3E, 'Chapter 8, Disk Striping'," National Energy Research Scientific Computing Center (NERSC), http://hpcfnersc.gov, last accessed on Dec. 27, 2002.

"NITROX™ XL Security Acceleration Modules PCI 3V or 3V/5V-Universal Boards for SSL and IPSec," at http://www.Caviumnetworks.com, (2002) pp. 1, Cavium Networks, Mountain View, CA USA.

"PCI, PCI-X," at http://www.cavium.com/acceleration_boards_PCI_PCI-X.htm (Downloaded Oct. 2008), Cavium Networks—Products > Acceleration Boards > PCI, PCI-X.

"Plan 9 kernel history: overview / file list / diff list," <http://switch.com/cgi-bin/plan9history.cgi?f=2001/0126/pc/etherga620.com>, accessed Oct. 22, 2007, pp. 1-16.

"Respond to server depending on TCP::client_port", DevCentral Forums iRules, pp. 1-6, last accessed Mar. 26, 2010, (http://devcentral.f5.com/Default/aspx?tabid=53&forumid=5&tpage=1&v).

"Scaling Next Generation Web Infrastructure with Content-Intelligent Switching: White Paper," Apr. 2000, p. 1-9 Alteon Web Systems, Inc.

"Servlet/Applet/HTML Authentication Process With Single Sign-On," Research Disclosure 429128, Jan. 2000, pp. 163-164, IBM Corporation.

"TCP-Transmission Control Protocol (TCP Fast Retransmit and Recovery)," EventHelix.com/EventStudio1.0, Mar. 28, 2002, pp. 1-5.

"The AFS File System in Distributed Computing Environment," www.transarc.ibm.com/Library/whitepapers1AFSI afsoverview.html, last accessed on Dec. 20, 2002.

"Traffic Surges; Surge Queue; Netscaler Defense," 2005, PowerPoint Presentation, slides 1-12, Citrix Systems, Inc.

"UDDI Overview", Sep. 6, 2000, pp. 1-21, uddi.org, (http://www.uddi.org/).

"UDDI Technical White Paper," Sep. 6, 2000, pp. 1-12, uddi-org, (http://www.uddi.org/).

"UDDI Version 3.0.1", UDDI Spec Technical Committee Specification, Oct. 14, 2003, pp. 1-383, uddi.org, (http:// wwwwddi.org/).

"VERITAS SANPoint Foundation Suite(tm) and SANPoint Foundation Suite(tm) HA: New VERITAS Volume Management and File System Technology for Cluster Environments," Sep. 2001, VERITAS Software Corp.

"Windows Clustering Technologies—An Overview," Nov. 2001, Microsoft Corp., www.microsoft.com, last accessed on Dec. 30, 2002.

"Windows Server 2003 Kerberos Extensions," Microsoft TechNet, 2003 (Updated Jul. 31, 2004), http://technet.microsoft.com/en-us/library/cc738207, Microsoft Corporation.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

Aguilera, Marcos K. et al., "Improving recoverability in multi-tier storage systems," International Conference on Dependable Systems and Networks (DSN-2007), Jun. 2007, 10 pages, Edinburgh, Scotland.

Anderson, Darrell C. et al., "Interposed Request Routing for Scalable Network Storage," ACM Transactions on Computer Systems 20(1): (Feb. 2002), pp. 1-24.

Anonymous, "How DFS Works: Remote File Systems," Distributed File System (DFS) Technical Reference, retrieved from the Internet on Feb. 13, 2009:URL<:http://technetmicrosoft.com/en-us/libranficc782417WS.10,printer).aspx> (Mar. 2003).

Anonymous, "Memory Mapping and DMA," Chapter 15, pp. 412-463, Jan. 21, 2005.

Apple, Inc., "Mac OS X Tiger Keynote Intro. Part 2," Jun. 2004, www.youtube.com <http://www.youtube.com/watch?v=zSBJwEmRJbY>, p. 1.

Apple, Inc., "Tiger Developer Overview Series: Working with Spotlight," Nov. 23, 2004, www.apple.com using www.archive.org<http://web.archive_org/web/20041123005335/developerapple.com/macosx/tiger/spotlight. html>, pp. 1-6.

Baer, T., et al., "The elements of Web services" ADTmag.com, Dec. 1, 2002, pp. 1-6, (http://www_adtmag.rn).

Basney et al., "Credential Wallets: A Classification of Credential Repositories Highlighting MyProxy," TPRC 2003, Sep. 19-21, 2003, pp. 1-20.

Bell Laboratories, "Layer 4/7 Switching and Other Custom IP Traffic Processing using the NEPPI API," Lucent Technologies, pp. 1-11, Murray Hill, NJ.

Blue Coat, "Technology Primer: CIFS Protocol Optimization," Blue Coat Systems Inc., 2007, last accessed: Dec. 9, 2013, pp. 1-3, (http://www.bluecoat.com).

Botzum, Keys, "Single Sign on—A Contrarian View," Open Group Website, <http://www.opengroup.org/security/ topics.htm>, Aug. 6, 2001, pp. 1-8.

Cabrera et al., "Swift: A Storage Architecture for Large Objects," In Proceedings of the-Eleventh IEEE Symposium on Mass Storage Systems, Oct. 1991, pp. 123-128.

Cabrera et al., "Swift: Using Distributed Disk Striping to Provide High I/O Data Rates," Fall 1991, pp. 405-436, vol. 4, No. 4, Computing Systems.

Cabrera et al., "Using Data Striping in a Local Area Network," 1992, technical report No. UCSC-CRL-92-09 of the Computer & Information Sciences Department of University of California at Santa Cruz.

Callaghan et al., "NFS Version 3 Protocol Specifications" (RFC 1813), Jun. 1995, The Internet Engineering Task Force (IETN), www_ietforg, last accessed on Dec. 30, 2002.

Carns et al., "PVFS: A Parallel File System for Linux Clusters," in Proceedings of the Extreme Linux Track: 4th Annual Linux Showcase and Conference, Oct. 2000, pp. 317-327, 327, Atlanta, Georgia, USENIX Association.

Cavale, M. R., "Introducing Microsoft Cluster Service (MSCS) in the Windows Server 2003", Microsoft Corporation, Nov. 2002.

Crescendo Networks, "Application Layer Processing (ALP)," 2003-2009, pp. 168-186, Chapter 9, CN-5000E/5500E, Foxit Software Company.

English Translation of Notification of Reason(s) for Refusal for JP 2002-556371 (Dispatch Date: Jan. 22, 2007).

F5 Networks Inc., "3-DNS® Reference Guide, version 4.5", F5 Networks Inc., Sep. 2002, pp. 2-1-2-28, 3-1-3-12, 5-1-5-24, Seattle, Washington.

F5 Networks Inc., "BIG-IP® Reference Guide, version 4.5", F5 Networks Inc., Sep. 2002, pp. 11-1-11-32, Seattle, Washington.

F5 Networks Inc., "Case Information Log for 'Issues with BoNY upgrade to 4.3'", as early as Feb. 2008.

F5 Networks Inc., "Configuration Guide for Local Traffic Management", F5 Networks Inc., Jan. 2006, version 9.2.2, 406 pgs.

F5 Networks Inc., "Deploying the BIG-IP LTM for Diameter Traffic Management," F5® Deployment Guide, Publication date Sep. 2010, Version 1.2, pp. 1-19.

F5 Networks Inc., "F5 Diameter RM", Powerpoint document, Jul. 16, 2009, pp. 1-7.

(56) References Cited

OTHER PUBLICATIONS

F5 Networks Inc., "F5 WANJet CIFS Acceleration", White Paper, F5 Networks Inc., Mar. 2006, pp. 1-5, Seattle, Washington.
F5 Networks Inc., "Routing Global Internet Users to the Appropriate Data Center and Applications Using F5's 3DNS Controller", F5 Networks Inc., Aug. 2001, pp. 1-4, Seattle, Washington, (http://www.f5.com/f5producs/3dns/ relatedMaterials/UsingF5.htnnl).
F5 Networks Inc., "Using F5's 3-DNS Controller to Provide High Availability Between Two or More Data Centers", F5 Networks Inc., Aug. 2001, pp. 1-4, Seattle, Washington, (http://www.f5.com/f5products/3dns/ relatedMaterials/3DNSRouting.html).
F5 Networks, Inc., "BIG-IP Controller with Exclusive OneConnect Content Switching Feature Provides a Breakthrough System for Maximizing Server and Network Performance," Press Release, May 8, 2001, 2 pages, Las Vegas, Nevada.
Fajardo V., "Open Diameter Software Architecture", Jun. 25, 2004, pp. 1-6, Version 1.0.7.
Fan et al., "Summary Cache: A Scalable Wide-Area Web Cache Sharing Protocol", Computer Communications Review, Association Machinery, New York, USA, Oct. 1998, vol. 28, Web Cache Sharing for Computing No. 4, pp. 254-265.
Farley, M., Book Review, by Enterprise Storage Forum Staff, of "Building Storage Networks," Jan. 2001, McGraw-Hill, ISBN 0072130725.
Fielding et al., "Hypertext Transfer Protocol—HTTP/1.1," Network Working Group, RFC: 2068, Jan. 1997, pp. 1-162.
Fielding et al., "Hypertext Transfer Protocol—HTTP/1.1," Network Working Group, RFC: 2616, Jun. 1999, pp. 1-176, The Internet Society.
Floyd et al., "Random Early Detection Gateways for Congestion Avoidance," Aug. 1993, pp. 1-22, IEEE/ACM Transactions on Networking, California.
Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997.
Gibson et al., "NASD Scalable Storage Systems," Jun. 1999, USENIX99, Extreme Linux Workshop, Monterey, California.
Gupta et al., "Algorithms for Packet Classification", Computer Systems Laboratory, Stanford University, CA, Mar./ Apr. 2001, pp. 1-29.
Harrison, C., May 19, 2008 response to Communication pursuant to Article 96(2) EPC dated Nov. 9, 2007 in corresponding European patent application No. 02718824.2.
Hartman, J., "The Zebra Striped Network File System," 1994, Ph.D. dissertation submitted in the Graduate Division of the University of California at Berkeley.
Harvey A.F. et al., "DMA Fundamentals on Various PC Platforms," National Instruments Corporation: Application Note 011, Apr. 1991, pp. 1-18, 340023-01.
Haskin et al., "The Tiger Shark File System," 1996, in proceedings of IEEE, Spring COMPCON, Santa Clara, CA, www.research_ibm.com, last accessed on Dec. 30, 2002.
Heinz G., "Priorities in Stream Transmission Control Protocol (SCTP) Multistreaming", Thesis submitted to the Faculty of the University of Delaware, Spring 2003, pp. 1-35.
Hochmuth, Phil, "F5, CacheFlow pump up content-delivery lines," Network World Fusion, May 4, 2001, 1 page, Las Vegas, Nevada.
Hu, J., Final Office action dated Sep. 21, 2007 for related U.S. Appl. No. 10/336,784.
Hu, J., Office action dated Feb. 6, 2007 for related U.S. Appl. No. 10/336,784.
Hwang et al., "Designing SSI Clusters with Hierarchical Checkpointing and Single 1/0 Space," IEEE Concurrency, Jan.-Mar. 1999, pp. 60-69.
Ilvesmaki M., et al., "On the Capabilities of Application Level Traffic Measurements to Differentiate and Classify Internet Traffic", Presented in SPIE's International Symposium ITcom, Aug. 19-21, 2001, pp. 1-11, Denver, Colorado.

International Search Report and the Written Opinion, for International Patent Application No. PCT/US2011/058469, dated May 30, 2012.
International Search Report and the Written Opinion, for International Patent Application No. PCT/US2013/026615, dated Jul. 4, 2013.
International Search Report dated Mar. 25, 2011 issued to the Priority International Application No. PCT/FR2011/050041.
European Search Report for European Patent Application No. 14191232.9 (dated Feb. 12, 2015).
International Search Report for International Patent Application No. PCT/US 2008/083117 (dated Jun. 23, 2009).
International Search Report for International Patent Application No. PCT/US2008/060449 (dated Sep. 4, 2008).
International Search Report for International Patent Application No. PCT/US2008/064677 (dated Jun. 9, 2009).
International Search Report for International Patent Application No. PCT /US02/00720, dated Mar. 19, 2003.
International Search Report from International Application No. PCT/US03/41202, dated Sep. 15, 2005.
Internet Protocol, "DARPA Internet Program Protocol Specification", (RFC:791), Information Sciences Institute, University of Southern California, Sep. 1981, pp. 1-49.
Karamanolis, C. et al., "An Architecture for Scalable and Manageable File Services," HPL-2001-173, Jul. 26, 2001. p. 1-114.
Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.
Kawamoto, D., "Amazon files for Web services patent", CNET News.com, Jul. 28, 2005, pp. 1-2, (http:/Inews. com).
Kimball, C.E. et al., "Automated Client-Side Integration of Distributed Application Servers," 13th Lisa Conf., 1999, pp. 275-282 of the Proceedings.
Klayman, J., Nov. 13, 2008 e-mail to Japanese associate including instructions for response to office action dated May 26, 2008 in corresponding Japanese patent application No. 2002-556371.
Klayman, J., Jul. 18, 2007 e-mail to Japanese associate including instructions for response to office action dated Jan. 22, 2007 in corresponding Japanese patent application No. 2002-556371.
Klayman, J., Response filed by Japanese associate to office action dated Jan. 22, 2007 in corresponding Japanese patent application No. 2002-556371.
Kohl et al., "The Kerberos Network Authentication Service (V5)," RFC 1510, Sep. 1993. (http://www.ietf.org/ rfc/rfc1510.txt?number=1510).
Korkuzas, V., Communication pursuant to Article 96(2) EPC dated Sep. 11, 2007 in corresponding European patent application No. 02718824.2-2201.
LaMonica M., "Infravio spiffs up Web services registry idea", CNET News.com, May 11, 2004, pp. 1-2, (http://www. news.com).
Lelil, S., "Storage Technology News: AutoVirt adds tool to help data migration projects," Feb. 25, 2011, last accessed Mar. 17, 2011, <http://searchstorage.techtarget.cominews/article/0,289142,sid5_gci1527986,00. html>.
Long et al., "Swift/RAID: A distributed RAID System", Computing Systems, Summer 1994, vol. 7, pp. 333-359.
Mac Vittie, L., "Message-Based Load Balancing: Using F5 solutions to address the challenges of scaling Diameter, RADIUS, and message-oriented protocols", F5 Technical Brief, 2005, pp. 1-9, F5 Networks Inc., Seattle, Washington.
Mangino John, "Using DMA with High Performance Peripherals to Maximize System Performance," WW TMS470 Catalog Applications, SPNA105, Jan. 2007, PowerPoint presentation, slides 1-23.
Modiano E., "Scheduling Algorithms for Message Transmission Over a Satellite Broadcast System," MIT Lincoln Laboratory Advanced Network Group, Nov. 1997, pp. 1-7.
Mogul, Jeffrey, C., "The Case for Persistent-Connection HTTP," SIGCOMM '95, 1995, pp. 299-313, Cambridge, MA.
Nichols K., et al., "Definition of the Differentiated Services Field (DS Field) in the IPv4 and IPv6 Headers", (RFC:2474) Network Working Group, Dec. 1998, pp. 1-19, (http://www.iettorg/rfc/rfc2474.txt).

(56) References Cited

OTHER PUBLICATIONS

Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.
Norton et al., "Common Internet File System (CIFS) Version CIFS-Spec 0.9," 2001, Storage Networking Industry Association (SNIA), www.snia_org, last accessed on Mar. 26, 2001.
Novotny et al., "An Online Credential Repository for the Grid: MyProxy," 2001, pp. 1-8.
Office Action for Canadian Patent Application No. 2,788,434, dated Nov. 4, 2016, pp. 1-4.
Ott D., et al., "A Mechanism for TCP-Friendly Transport-level Protocol Coordination", USENIX Annual Technical Conference, Jun. 10, 2002, University of North Carolina at Chapel Hill, pp. 1-12.
OWASP, "Testing for Cross site scripting", OWASP Testing Guide v2, Table of Contents, Feb. 24, 2011, pp. 1-5, (www_owasp_org/index.php/Testing_for_Cross_site_scripting).
Padmanabhan V., et al., "Using Predictive Prefetching to Improve World Wide Web Latency", SIGCOM, Jul. 1, 1996, pp. 1-15.
Pashalidis et al., "A Taxonomy of Single Sign-On Systems," 2003, pp. 1-16, Royal Holloway, University of London, Egham Surray, TW20, OEX, United Kingdom.
Pashalidis et al., "Impostor: A Single Sign-On System for Use from Untrusted Devices," Global Telecommunications Conference, 2004, GLOBECOM '04, IEEE, Issue Date: Nov. 29-Dec. 3, 2004.Royal Holloway, University of London.
Patterson et al., "A Case for Redundant Arrays of Inexpensive Disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.
Pearson, P.K., "Fast Hashing of Variable-Length Text Strings," Comm. of the ACM, Jun. 1990, pp. 1-4, vol. 33, No. 6.
Peterson, M., "Introducing Storage Area Networks," Feb. 1998, InfoStor, www.infostor.com, last accessed on Dec. 20, 2002.
Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix. org, last accessed on Dec. 20, 2002.
Rabinovich, Michael et al., "DHTTP: An Efficient and Cache-Friendly Transfer Protocol for the Web," IEEE/ACM Transactions on Networking 12(6):1007-1020 (Dec. 2004).
Response filed Jul. 6, 2007 to Office action dated Feb. 6, 2007 for related U.S. Appl. No. 10/336,784.
Response filed Mar. 20, 2008 to Final Office action dated Sep. 21, 2007 for related U.S. Appl. No. 10/336,784.
Rodriguez et al., "Parallel-Access for Mirror Sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000 (Mar. 26, 2000), pp. 864-873, XP010376176 ISBN: 0-7803-5880-5 p. 867, col. 2, last paragraph—p. 868, col. 1, paragraph 1.
Rosen E., et al., "MPLS Label Stack Encoding", (RFC:3032) Network Working Group, Jan. 2001, pp. 1-22, (http://www.ieff.org/rfc/rfc3032.txt).
RSYNC, "Welcome to the RSYNC Web Pages," Retrieved from the Internet URL: http://samba.anu.edu.utssync/. (Retrieved on Dec. 18, 2009).
Salchow, Jr., KJ, "Clustered Multiprocessing: Changing the Rules of the Performance Game," F5 White Paper, Jan. 2008, pp. 1-11, F5 Networks, Inc.
Savage, et al., "AFRAID—A Frequently Redundant Array of Independent Disks," Jan. 22-26, 1996, pp. 1-13, USENIX Technical Conference, San Diego, California.
Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.
Schilit B., "Bootstrapping Location-Enhanced Web Services", University of Washington, Dec. 4, 2003, (http:// www_cs.washington.edu/news/colloqinfo.html).
Seeley R., "Can Infravio technology revive UDDI?", ADTmag.com, Oct. 22, 2003, (http://www.adtmag.com).
Shohoud, Y., "Building XML Web Services with VB .NET and VB 6", Addison Wesley, Sep. 2002, pp. 1-14.
Sleeper B., "The Evolution of UDDI", UDDI.org White Paper, The Stencil Group, Inc., Jul. 19, 2002, pp. 1-15, San Francisco, California.
Sleeper B., "Why UDDI Will Succeed, Quietly: Two Factors Push Web Services Forward", The Stencil Group, Inc., Apr. 2001, pp. 1-7, San Francisco, California.
Soltis et al., "The Design and Performance of a Shared Disk File System for IRIX," Mar. 23-26, 1998, pp. 1-17, Sixth NASA Goddard Space Flight Center Conference on Mass Storage and Technologies in cooperation with the Fifteenth IEEE Symposium on Mass Storage Systems, University of Minnesota.
Soltis et al., "The Global File System," Sep. 17-19, 1996, in Proceedings of the Fifth NASA Goddard Space Flight Center Conference on Mass Storage Systems and Technologies, College Park, Maryland.
Sommers F., "Whats New in UDDI 3.0—Part 1", Web Services Papers, Jan. 27, 2003, pp. 1-4, (http://www. webservices_org/index_php/article/articleprint/8711-1/241).
Sommers F., "Whats New in UDDI 3.0—Part 2", Web Services Papers, Mar. 2, 2003, pp. 1-8, (http://www.web. archive_org/web/20040620131006/).
Sommers F., "Whats New in UDDI 3.0—Part 3", Web Services Papers, Sep. 2, 2003, pp. 1-4, (http://www. webservices_org/index_php/article/articleprint/894/-1/241).
Sorenson, K.M., "Installation and Administration: Kimberlite Cluster Version 1.1.0, Rev. Dec. 2000," Mission Critical Linux, http://oss.missioncriticallinux.com/kimberlite/kimberlite.pdf.
Stakutis, C., "Benefits of SAN-based file system sharing," Jul. 2000, pp. 1-4, InfoStor, www.infostor.com, last accessed on Dec. 30, 2002.
Stevens, W., "TCP Slow Start, Congestion Avoidance, Fast Retransmit, and Fast Recovery Algorithms," Network Working Group; RFC: 2001; Standards Track, Jan. 1997, pp. 1-6, NOAO.
Thekkath et al., "Frangipani: A Scalable Distributed File System," in Proceedings of the 16th ACM Symposium on Operating Systems Principles, Oct. 1997, pp. 1-14, Association for Computing Machinery, Inc.
Tulloch, Mitch, "Microsoft Encyclopedia of Security," 2003, pp. 218, 300-301, Microsoft Press, Redmond, Washington.
Uesugi, H., Nov. 26, 2008 amendment filed by Japanese associate in response to office action dated May 26, 2008 in corresponding Japanese patent application No. 2002-556371.
Uesugi, H., English translation of office action dated May 26, 2008 in corresponding Japanese patent application No. 2002-556371.
Uesugi, H., Jul. 15, 2008 letter from Japanese associate reporting office action dated May 26, 2008 in corresponding Japanese patent application No. 2002-556371.
Wadge, Wallace, "Achieving Gigabit Performance on Programmable Ethernet Network Interface Cards," May 29, 2001, pp. 1-9.
Wang B., "Priority and realtime data transfer over the best-effort Internet", Dissertation Abstract, ScholarWorks@UMASS, Sep. 2005, pp. i-xiv and pp. 1-9.
Welch, Von, "A User's Guide to TCP Windows," http://www.vonwelch.com/report/tcp_windows, updated 1996, last accessed Jan. 29, 2010, pp. 1-5.
Wikipedia, "Diameter (protocol)", pp. 1-11, last accessed Oct. 27, 2010, (http://en.wikipedia.org/wiki/Diameter_ (protocol)).
Wikipedia, "Direct memory access," <http://en.wikipedida.org/wiki/Direct_memory_access>, last modified Oct. 1, 2009.
Wikipedia, "Nagle's algorithm," <http://en.wikipedia.org/wiki/Nagle%27s_algorithm>, last modified Oct. 9, 2009.
Wilkes, J., et al., "The HP AutoRAID Hierarchical Storage System," Feb. 1996, vol. 14, No. 1, ACM Transactions on Computer Systems.
Williams et al., "The Ultimate Windows Server 2003 System Administrator's Guide: Forwarding Authentication," 2003, 2 pages, Figure 10.7, Addison-Wesley Professional, Boston, Massachusetts.

(56) References Cited

OTHER PUBLICATIONS

Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).

Zayas, E., "AFS-3 Programmers Reference: Architectural Overview," Transarc Corp., version 1.0 of Sep. 2, 1991, doc. No. FS-00-D160.

Bell Laboratories, "Layer 4/7 Switching and Other Custom IP Traffic Processing Using the NEPPI API," Bell Laboratories, Lucent Technologies, Murray Hill, NJ 07974 USA, pp. 1-11 (2000).

SYSTEM AND METHOD FOR ACHIEVING HARDWARE ACCELERATION FOR ASYMMETRIC FLOW CONNECTIONS

The present application claims priority to U.S. patent application Ser. No. 13/770,685, filed Feb. 19, 2013, which claims priority to U.S. Provisional Patent Application Ser. No. 61/500,503, filed Feb. 17, 2012, each of which is hereby incorporated by reference in its entirety.

FIELD

This technology generally relates to managing network traffic in a virtual bladed chassis, and more particularly, to a system and method for achieving hardware acceleration for asymmetric flow connections.

BACKGROUND

The Internet's core bandwidth continues to double every year. Some of this additional bandwidth is consumed as more and more users access the Internet. Other additional bandwidth is consumed as existing users increase their use of the Internet. This increase of Internet use translates into an increase in traffic directed to and from World Wide Web servers ("Web servers").

Replacing a Web server with another Web server having twice the capacity is a costly undertaking, whereas merely adding the new Web server(s) is less costly but usually requires a load-balancing mechanism to balance workload so that each virtual server performs work proportional to its capacity. Network traffic management devices positioned between client devices and the Web servers typically handle the load balancing functions, which typically more processing of data packets communicated between the client devices and Web servers. With increasing traffic, the network traffic management device will eventually not be able to process traffic in a timely manner.

For software assisted hardware acceleration, at connection establishment, a software module may push connection flow signature and transformation data to a hardware device to perform acceleration on the flow. The flow signature and transformation data is typically pushed in a single transaction in which the signature and transformation data is embedded with the flow header and data. Accordingly, two flow signature and transformation entries may be created accordingly. This approach incorrectly assumes that these two flows are symmetric and are reversible. However, for an asymmetric flow connection, the client-to-server and server-to-client flows have different flow signature and transformation information. Therefore, the flow may be accelerated in one direction while the flow in the other direction may not be properly accelerated.

What is needed is a system and method for achieving hardware acceleration for asymmetric flow connections.

SUMMARY

In an aspect, a method for performing connection flow management between a hardware device and a software module is disclosed. The method comprises establishing, at a network traffic management device having a software module and a hardware acceleration device, a flow connection setup for a flow connection between a client device and a server. The method comprises determining if the flow connection is symmetrical or asymmetrical in nature. The method comprises generating, at the software module, a flow signature entry and a transformation data entry for the flow connection in the first flow direction and a second flow direction opposite to the first flow direction, wherein the first and second flow directions are capable of being either symmetric or asymmetric in nature. The method comprises sending the flow signature entry and the transformation data entry for the first and second flow directions from the software module to the hardware acceleration device, wherein the hardware acceleration device at least stores the flow signature entry and the transformation data entry for the first and second flow directions, the hardware acceleration device configured to utilize the flow signature entry and the transformation data entry to perform acceleration on data packets in the first and second flow directions.

In an aspect, a non-transitory computer readable medium having stored computer executable code thereon in form of instructions for connection flow management to be performed by a network traffic management device is disclosed. The network traffic management device executes the code which causes at least a portion of the network traffic management device to perform a method. The method comprises establishing, at a hardware acceleration device of a network traffic management device, a flow connection setup for a flow connection to be handled by the network traffic management device between a client device and a server. The method comprises determining if the flow connection is symmetrical or asymmetrical in nature. The method comprises generating, at the software module, a flow signature entry and a transformation data entry for the flow connection in the first flow direction and a second flow direction opposite to the first flow direction, wherein the first and second flow directions are capable of being either symmetric or asymmetric in nature. The method comprises sending the flow signature entry and the transformation data entry for the first and second flow directions from the software module to the hardware acceleration device, wherein the hardware acceleration device at least stores the flow signature entry and the transformation data entry for the first and second flow directions, the hardware acceleration device configured to utilize the flow signature entry and the transformation data entry to perform acceleration on data packets in both first and second flow directions.

In an aspect, a network traffic management device is disclosed. The device comprises a memory stored thereon machine executable code comprising instructions for performing connection flow management. The device comprises a hardware-based network interface controller coupled to the memory and capable of receiving and forwarding data packets over a network that relate to a plurality of applications. The network interface controller configured to establish a flow connection setup for a flow connection between a client device and a server via the network traffic management device and operate as an acceleration device. The device includes a processor operably coupled with the memory and the network interface controller. The processor is configured to execute programmed instructions stored in the memory which causes the network traffic management device to perform a method. The method comprises determining if the flow connection is symmetrical or asymmetrical in nature. The method comprises generating a flow signature entry and a transformation data entry for the flow connection in the first flow direction and a second flow direction opposite to the first flow direction, wherein the first and second flow directions are capable of being either symmetric or asymmetric in nature. The method comprises sending the flow signature entry and the transformation data entry for the first and second flow directions to the network interface controller. The network interface controller at least stores the flow signature entry and the transformation data entry for the first and second flow directions. The network interface controller is configured to utilize the flow signature entry and the transformation data entry to perform acceleration on data packets in both of the first and second flow directions.

In one or more of the above aspects, the method performed by the network traffic management device further comprises generating a flow creation message, wherein the flow creation message includes information associated with a flow type, actual data or pass flow information associated with the flow connection.

In one or more of the above aspects, the method performed by the network traffic management device further comprises updating the flow signature entry and the transformation data entry for the flow connection.

In one or more of the above aspects, the network interface controller is a high speed bridge.

In one or more of the above aspects, the method performed by the network traffic management device further comprises receiving, at the network interface controller, the flow signature and the transformation data entry; and storing the flow signature and the transformation data entry in a flow table in the memory.

In one or more of the above aspects, the method performed by the network traffic management device further comprises identifying a first flow connection associated with the received data packets; and accessing the memory to determine if the first flow connection is in a flow table. In one or more of the above aspects, method performed further comprises forwarding the data packets to a DMA when the first flow connection is not in the flow table.

In one or more of the above aspects, the method performed by the network traffic management device further comprises retrieving a first flow signature entry and a first transform information entry associated with the first flow connection; and transforming and multiplexing the data packets of the first flow connection into a transmit data path.

In one or more of the above aspects, the method performed by the network traffic management device further comprises determining that the flow connection employs a Direct Server Return (DSR) load balancing operation between the server and the client, wherein a response from the server is not received at the network traffic management device. The flow signature entry and the transform information entry is provided by the processor to the network interface to perform acceleration only on data packets traveling in one or more flow segments sent in a flow direction from the client device and the server.

In one or more of the above aspects, the method performed by the network traffic management device further comprises determining that the flow connection between the network traffic management device and the server is reused for multiple requests from one or more client devices and providing the flow signature entry and the transform information entry to the network interface to perform hardware acceleration only on data packets in one or more flow segments between the client device and the network traffic management device.

DETAILED DESCRIPTION

Figure 1:
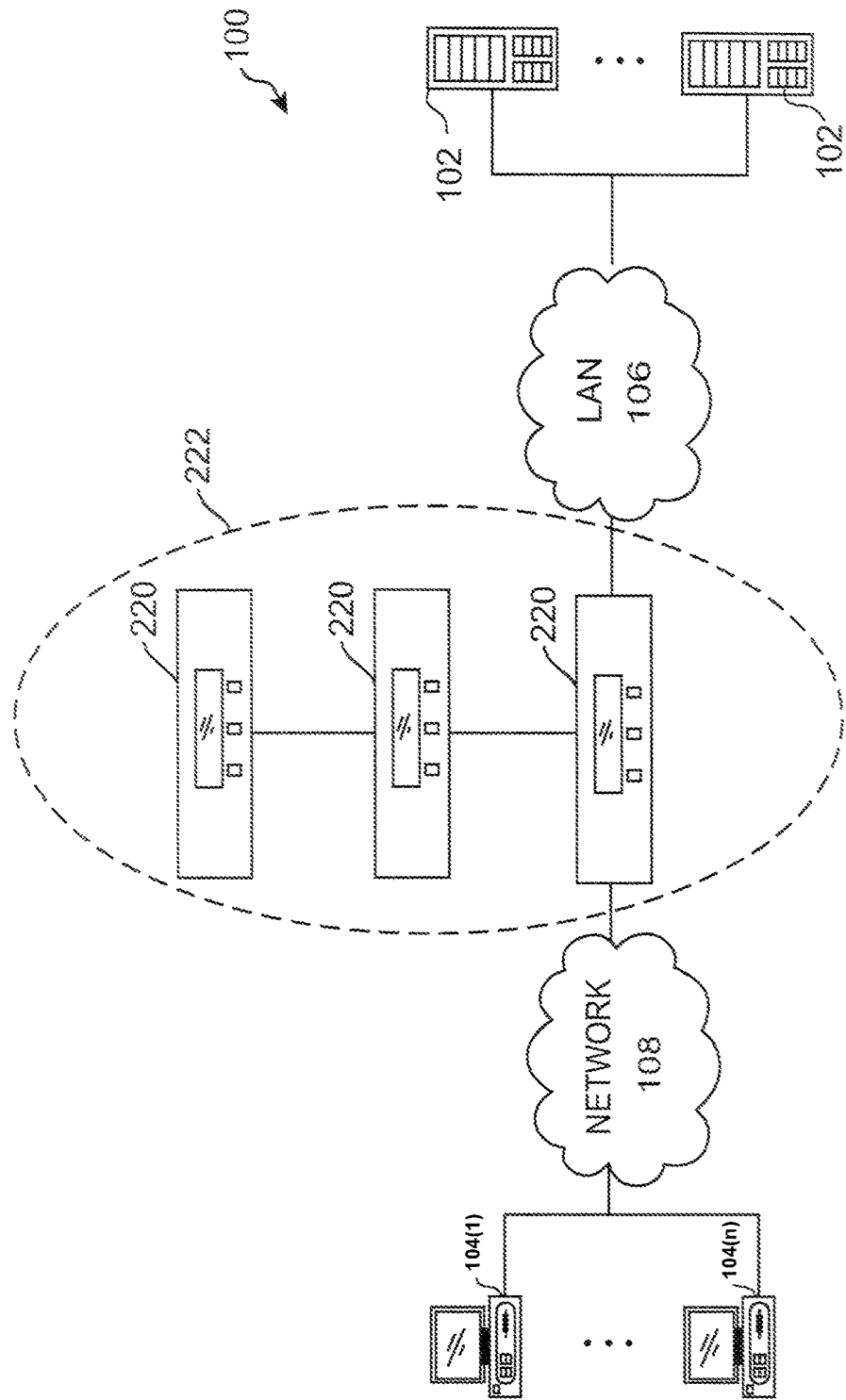
FIG. 1 illustrates an exemplary network system environment using a virtualized network traffic management system in accordance with an aspect of the present disclosure.

FIG. 1 illustrates an exemplary network system environment using one or more virtualized network traffic management apparatus for achieving hardware acceleration for asymmetric flow connections in accordance with an aspect of the present disclosure. Referring to FIG. 1, the exemplary network system 100 includes a network traffic management apparatus which includes one or more network traffic management systems 222, wherein each system 222 includes one or more network traffic management clusters 220 having one or more network traffic management devices 110 are configured to achieve hardware acceleration for symmetric and asymmetric flow connections.

The exemplary network system 100 can include one or more client devices shown as 104(1)-104(n). Client devices 104(1)-104(n) are coupled to the network traffic management device 110 via network 108, although other communication channels may be implemented. Generally, the client devices 104(1)-104(n) can include virtually any computing device capable of connecting to another computing device to send and receive information, including Web-based information. The set of such devices can include devices that typically connect using a wired (and/or wireless) communications medium, such as personal computers (e.g., desktops, laptops), tablets, set up boxes, mobile and/or smart phones and the like. In this example, the client devices can run browsers and other types of applications (e.g., web-based applications) that can provide an interface to make one or more requests to different server-based applications via the network 108, although requests for other types of network applications may be made by the client devices 104(1)-104(n).

Servers 102(1)-102(n) comprise one or more server computing machines or devices capable of operating one or more Web-based or non Web-based applications that may be accessed by network devices via the network 108, such as client devices 104(1)-104(n)). The server 102 may provide data representing requested resources, such as particular Web page(s), image(s) of physical objects, and any other web objects, in response to requests. It should be noted that the servers 102(1)-102(n) may perform other tasks and provide other types of resources.

The client devices 104(1)-104(n) in an aspect are configured to run interface applications such as Web browsers that can provide a user interface to make requests for and send data to different Web server-based applications via the network 108 and via one or more network traffic management devices 110. A series of network applications can run on the servers 102(1)-102(n) that allow the transmission of data that is requested by the client devices 104(1)-104(n). The servers 102(1)-102(n) can provide data or receive data in response to requests directed toward the respective applications on the servers 102(1)-102(n) from the client devices 104(1)-104(n). For example, as per the Transmission Control Protocol (TCP), packets can be sent to the servers 102(1)-102(n) from the requesting client devices 104(1)-104(n) to send data, although other protocols (e.g., FTP) may be used. It is to be understood that the servers 102(1)-102(n) can be hardware or software or can represent a system with multiple servers, which can include internal or external networks. In this example, the servers 102(1)-102(n) can be any version of Microsoft® IIS servers or Apache® servers, although other types of servers can be used. Further, additional servers can be coupled to the network 108 and/or LAN 106 and many different types of applications can be available on servers coupled to the network 108 and/or LAN 106.

A series of Web-based and/or other types of protected and unprotected network applications can run on the servers 102(1)-102(n) that allow the transmission of data that is requested by the client devices 104(1)-104(n). The client devices 104(1)-104(n) can be further configured to engage in a secure communication with the network traffic management device 110 and/or the servers 102(1)-102(n) using mechanisms such as Secure Sockets Layer (SSL), Internet Protocol Security (IPSec), Tunnel Layer Security (TLS), and the like.

In this example, the network 108 comprises a publicly accessible network, such as the Internet, which includes client devices 104(1)-104(n), although the network 108 may comprise other types of private and public networks that include other devices. Communications, such as requests from client devices 104(1)-104(n) and responses from servers 102(1)-102(n), take place over the network 108 according to standard network protocols, such as the HTTP and TCP/IP protocols in this example, but the principles discussed herein are not limited to this example and can include other protocols (e.g., FTP). Further, the network 108 can include local area networks (LANs), wide area networks (WANs), direct connections, other types and numbers of network types, and any combination thereof. On an interconnected set of LANs or other networks, including those based on different architectures and protocols, routers, switches, hubs, gateways, bridges, crossbars, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links, optical fibers, and other communications links known to those skilled in the relevant arts. In essence, the network 108 includes any communication medium and method by which data may travel between client devices 104(1)-104(n), servers 102(1)-102(n), and network traffic management device 110, and these devices are provided by way of example only. By way of example only, network 108 can provide responses and requests according to the Hyper-Text Transfer Protocol (HTTP) based application, request for comments (RFC) document(s) or the Common Internet File System (CIFS) or network file system (NFS) protocol in this example, although the principles discussed herein are not limited to these examples and can include other application protocols and other types of requests (e.g., File Transfer Protocol (FTP) based requests).

By way of example only and not by way of limitation, LAN 106 comprises a private local area network that is connected to the network traffic management device 110 and the one or more servers 102(1)-102(n), although the LAN 106 may comprise other types of private and public networks with other devices. Networks, including local area networks, besides being understood by those of ordinary skill in the relevant art(s), have already been described above in connection with network 108, and thus will not be described further here.

As shown in the example environment of network system 100 depicted in FIG. 1, the network traffic management system 222, which includes one or more network traffic management device clusters 220 can be interposed between the network 108 and the servers 102(1)-102(n) coupled via LAN 106 as shown in FIG. 1. Again, the network system 100 could be arranged in other manners with other numbers and types of devices. It should be understood that the devices and the particular configuration shown in FIG. 1 are provided for exemplary purposes only and thus are not limiting.

Generally, the network traffic management devices 110 in a cluster 220 manage network communications, which may include one or more client requests and server responses, to/from the network 108 between the client devices 104(1)-104(n) and one or more of the servers 102(1)-102(n) in LAN 106 in these examples. These requests may be destined for one or more servers 102(1)-102(n), and may take the form of one or more TCP/IP data packets originating from the network 108 which pass through one or more intermediate network devices and/or intermediate networks until ultimately reaching one or more network traffic management devices 110.

Figure 2A:
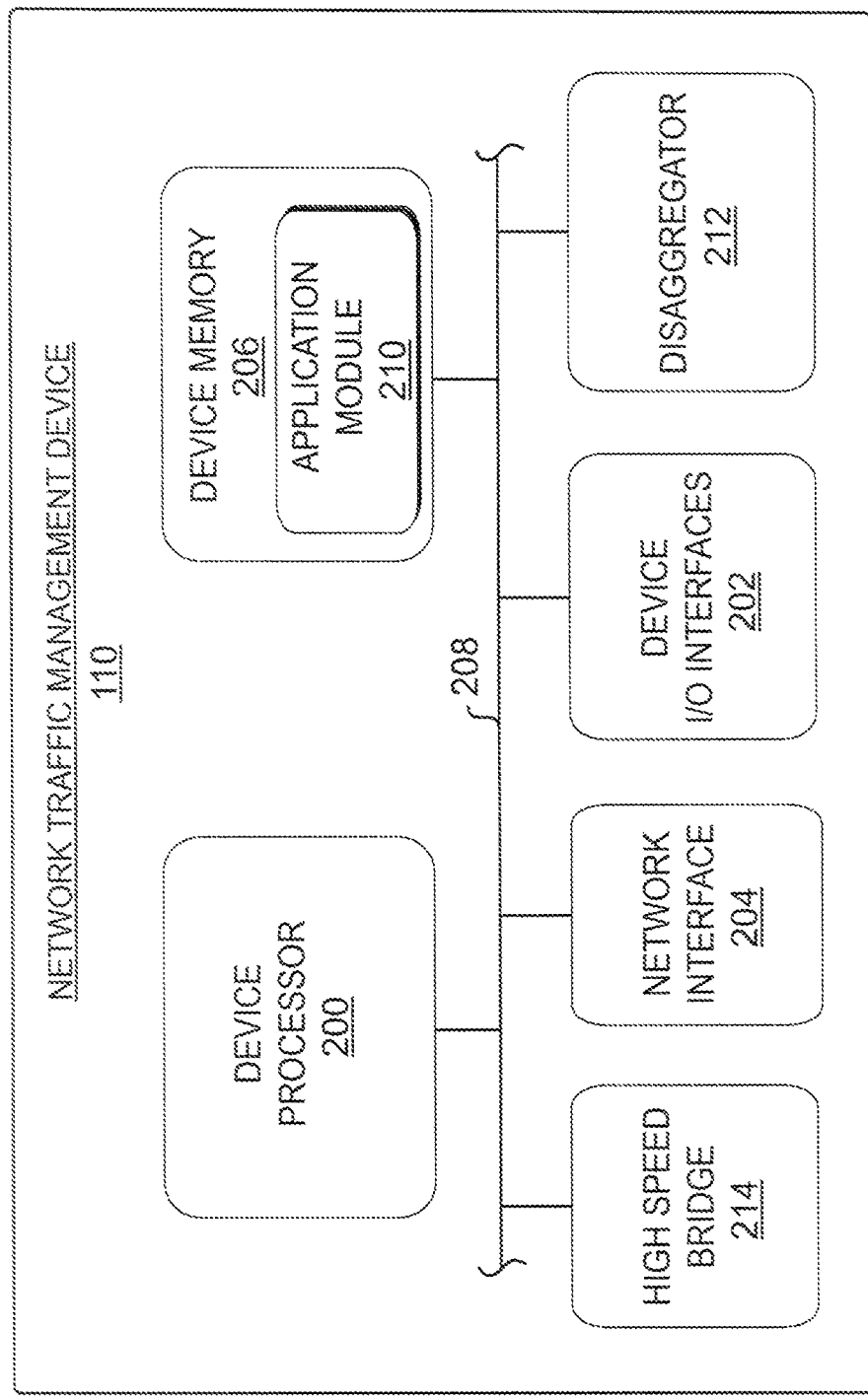
FIG. 2A is a block diagram of a network traffic management device in accordance with an aspect of the present disclosure.
Figure 2B:
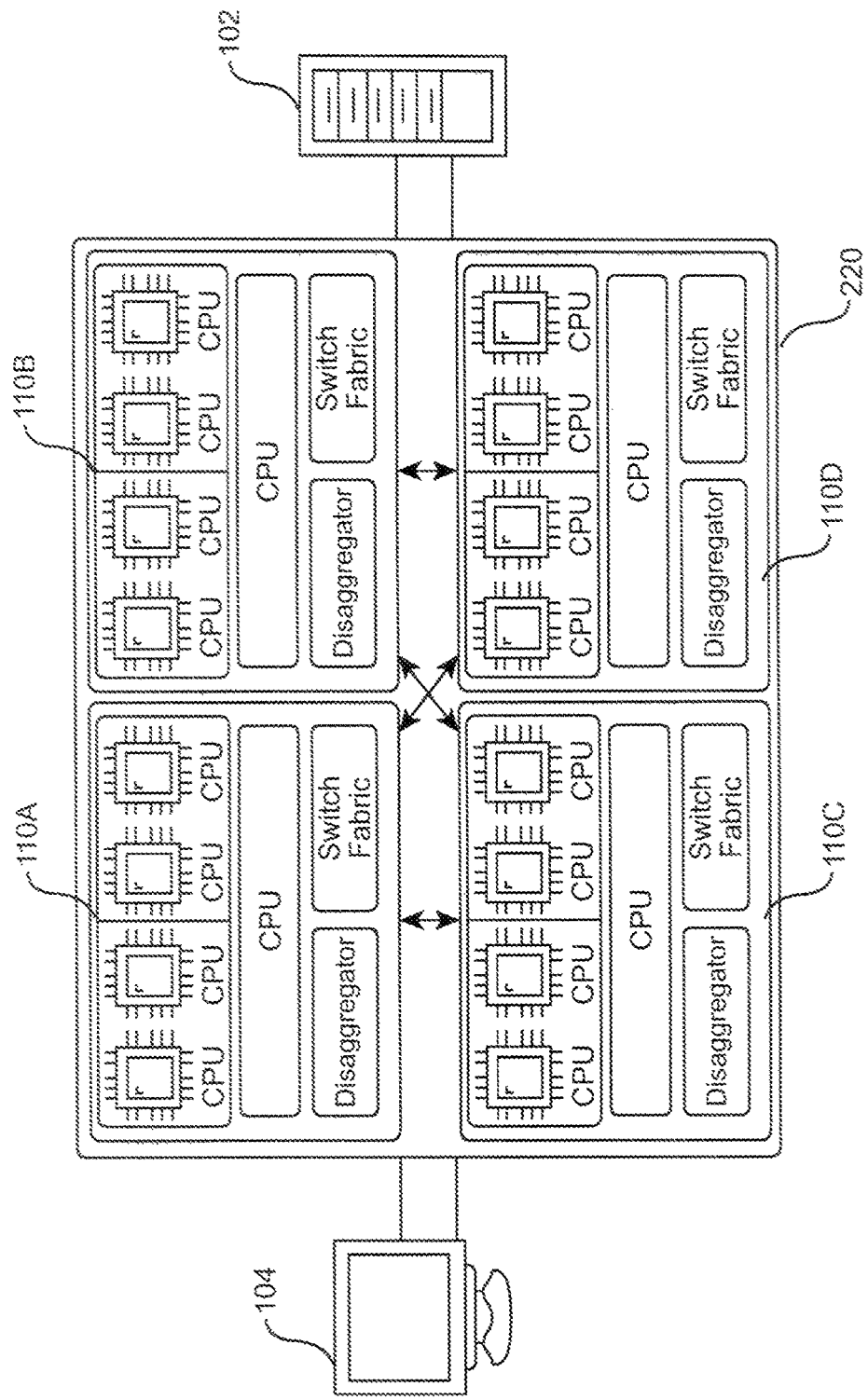
FIG. 2B is a block diagram of a network traffic management system with multiple network traffic management devices capable of operating in full virtualization mode in accordance with an aspect of the present disclosure.

As shown in FIG. 1, the network traffic management system 222 may include one or more network traffic management clusters 220, wherein each network traffic management cluster may include one or more network traffic management devices 110, as shown in FIG. 2B. The clusters 220 are configured to operate in a virtualized mode, whereby individual or combinations of processors or cores 220 among and/or between devices 110 may be used to execute virtual instances.

In an aspect, as discussed in FIG. 2B, one or more network traffic management devices 110 include a plurality of processors 200, whereby the processor(s) 200 allocate one or more connections to the servers 102(1)-102(n), which are one of the many measures of resource utilization of the servers 102(1)-102(n) by the client devices 104(1)-104(n). Some other examples of indicators relating to server resource utilization are bandwidth utilization, processor utilization, memory utilization and the like. In any case, the network traffic management cluster 220 may manage the network communications by performing several network traffic management related functions involving network communications, secured or unsecured, such as load balancing, access control, VPN hosting, network traffic acceleration, encryption, decryption, cookie and key management across multiple devices 110.

FIG. 2A is a block diagram of a network traffic management device in accordance with an aspect of the present disclosure. Referring to FIG. 2A, an example network traffic management device 110 includes one or more device processors or cores 200, one or more device I/O interfaces 202, one or more network interfaces 204, one or more device memories 206 (including an application module 210), one or more distributors or disaggregators 212, and one or more high speed bridges 214, and, all of which are coupled together by bus 208. It should be noted that the device 110 could include other types and numbers of components and is thereby not limited to the configuration shown in FIG. 2A.

FIG. 2B is a block diagram of a network traffic management cluster having a plurality of network traffic management devices in accordance with an aspect of the present disclosure. As shown in the example of FIG. 2B, the cluster 220 includes a plurality of network traffic management devices 110(A)-110(D) which include the processors 200, disaggregators 212, high speed bridge 214 and other components. It should be noted that although four network traffic management devices 110A-110D are shown, any number of network traffic management devices 110 in the system is contemplated. In an aspect, the network traffic management devices 110 may be referred to "blades", wherein the blades 110 are electronic circuit boards or cards that are installed in a hardware chassis and are configured to communicate with one another over a backplane. In an aspect, virtualized guest services, such as software and other virtualized applications may be executed as virtual instances by one or processors 200 running on different devices 110 in the cluster 220.

Referring back to FIG. 2A, the device processor or core 200 comprises one or more microprocessors configured to execute computer/machine readable and executable instructions stored in device memory 206. Such instructions, when executed by one or more processors, implement network traffic management related functions of the network traffic management device 110. The processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like.

Device I/O interfaces 202 comprise one or more user input and output device interface mechanisms. The interface may include a computer keyboard, mouse, display device, and the corresponding physical ports and underlying supporting hardware and software to enable the network traffic management devices 110 to communicate with other devices 110 and/or other network devices in the outside environment. Such communication may include accepting user data input and to provide user output, although other types and numbers of user input and output devices may be used. Additionally or alternatively, as will be described in connection with network interface 204 below, the network traffic management device 110 may communicate with the outside environment for certain types of operations (e.g., configuration) via a network management port. In an aspect, the I/O interface 202 may be a high speed bridge between the bus 208 and the network interface 204. The I/O interface 202 may be a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; a Serial Attached small computer system interface bus and the like.

Network interface 204 comprises one or more mechanisms that enable network traffic management device 110 to engage in network communications over the LAN 104 and the network 108 using one or more desired protocols (e.g. TCP/IP, UDP, HTTP, RADIUS, DNS). However, it is contemplated that the network interface 204 may be constructed for use with other communication protocols and types of networks. Network interface 204 is sometimes referred to as a transceiver, transceiving device, or network interface card (NIC), which transmits and receives network data packets to one or more networks, such as LAN 106 and network 108.

In an example where the network traffic management device 110 includes more than one device processor 200, each processor 200 (and/or core) may use the same single network interface 204 or a plurality of network interfaces 204. Further, the network interface 204 may include one or more physical ports, such as Ethernet ports, to couple the network traffic management device 110 with other network devices, such as other network traffic management devices 110 and/or Web servers 102. Moreover, the interface 204 may include certain physical ports dedicated to receiving and/or transmitting certain types of network data, such as device management related data for configuring the network traffic management device 110 and/or client request/server response related data.

Device memory 206 comprises non-transitory computer, processor or machine readable media, namely tangible computer readable or processor readable storage media, which are examples of machine-readable storage media. Computer readable storage/machine-readable storage media may include volatile, nonvolatile, removable, and non-removable media implemented in any method or technology for storage of information. Such storage media includes computer readable/machine-executable instructions, data structures, program modules, or other data, which may be obtained and/or executed by one or more processors, such as device processor 200. Such instructions, when executed by one or more processors, allows control of the general operation of network traffic management device 110 to manage network traffic, implement the application module 210, and perform the process described in the present disclosure. Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the information.

Bus 208 may comprise one or more internal device component communication buses, links, bridges and supporting components, such as bus controllers and/or arbiters. The bus enables the various components of the network traffic management device 110, such as the processor 200, device I/O interfaces 202, network interface 204, and device memory 206, to communicate with one another. However, it is contemplated that the bus may enable one or more components of the network traffic management device 110 to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the network traffic management device 110.

The distributor or disaggregator 212 performs the functions of selectively routing one or more data packets for a virtual instance to one or more selected processors 200 within or among network traffic management devices 110 within the virtualized cluster 220.

High speed bridge or HSB 214 is a hardware device that executes logic to perform various functions with respect to internal execution as well as handling communications with other network traffic management devices 110 in a cluster 220. The HSB 214 may be configured in application specific integrated circuits ("ASICs"), programmable logic devices ("PLDs"), field programmable logic devices ("FPLDs"), field programmable gate arrays ("FPGAs"), and the like. As will be described in more detail below, the HSB 214 in the present disclosure is configured to perform hardware acceleration functions on data packets based on symmetric and/or asymmetric flows.

In an aspect, the network traffic management cluster 220 is configured to provide full virtualization of guest services applications among multiple processors 200 of multiple network traffic management devices 110 within a cluster 220. In particular, when operating in the virtual environment, the network traffic management cluster 220 provides a virtual machine environment in which the individual network traffic management devices 110 provide a virtual simulation of the underlying hardware. With regard to virtualization, one or more network traffic management devices 110 in the network traffic management cluster 220 are configured to perform functions similar to a hypervisor. In particular, the network traffic management devices 110, in acting as a hypervisor, perform one or more hardware virtualization techniques which allow multiple operating systems, applications, or virtual machines ("guest services"), to run concurrently on one or more processors 200 of the devices 110(A)-110(D) in a cluster 220. In other words, the network traffic management devices 110, when operating in the virtualization mode, present a guest service with a virtual operating platform, whereby the network traffic management devices 110 implement and manage the execution of those guest service(s) among an emulated or virtualized set of hardware.

The execution of a guest operation occurs in a virtual instance, whereby one or more processors 200 on one or more network traffic management devices 110(A)-110(D) of the network traffic management system 220 share the virtualized hardware resources to execute a portion or all of the guest service's operations. In particular, the network traffic management devices 110, when operating in a virtualization mode, are able to, per virtual instance, manage the resources of the pre-selected processors 200 for any network traffic management device 110 in the cluster 220.

In general, the present system is directed to a network traffic management system which includes a plurality of network traffic management devices, wherein one or more network traffic management devices contain a plurality of processors or cores 200. The network traffic management devices in the network traffic management system are configured to operate in a full virtualization mode. The system of the present disclosure utilizes a unidirectional-based flow creation and management method, instead of traditional connection based method, to achieve hardware acceleration for both asymmetric and symmetric connection flows. Furthermore, the system and method provides the fundamentals for advanced fine tuned, flow management between the hardware device and the software system to achieve advanced application performance and flexibility.

Figure 2C:
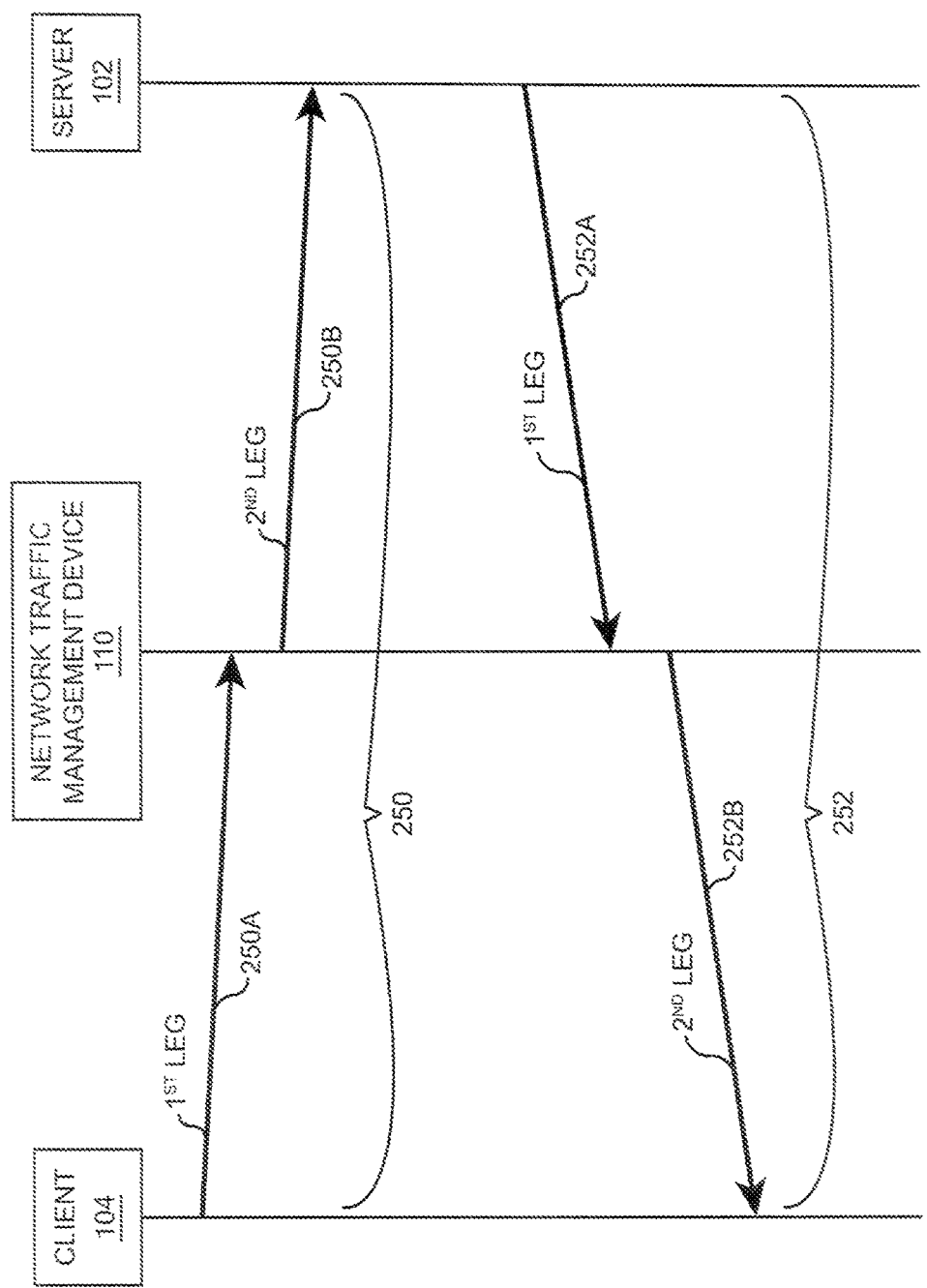
FIG. 2C is a ladder diagram illustrating flow directions associated with a flow connection in accordance with an aspect of the present disclosure.

FIG. 2C illustrates a ladder diagram showing the respective flow segments in a first flow direction and a second flow direction in accordance with an aspect of the present disclosure. As shown in FIG. 2C, a flow connection may contain a first flow direction 250 and a second flow direction 252, whereby the flow connection has a flow signature which contains information to uniquely identify the flow within a connection. The flow signature is usually found in L2, L3 and L4 protocol fields of the data packets in the flow. As shown in FIG. 2C, the network traffic management device 110 receives data packets from the client device 104 in an incoming first flow segment 250A and passes those data packets to the server 102 in an incoming second flow segment 250B. Similarly, the network traffic management device 110 receives data packets from the server 102 in an outgoing first flow segment 252A and passes those data packets to the client device 104 in an outgoing second flow segment 252B.

As will be described in more detail below, when the network traffic management device 110 performs hardware acceleration on the data packets, it will recognize the flow signature of the incoming or outgoing first flow segment 250A or 252A and replace it with the second flow segment 250B, 252B. In the case where the incoming and outgoing flows are symmetric, the segments for each flow direction are reversible. However, if the flows are asymmetric in nature, the flow signatures of the first and second segments in both directions may not be the same or even related to one another.

Figure 3A:
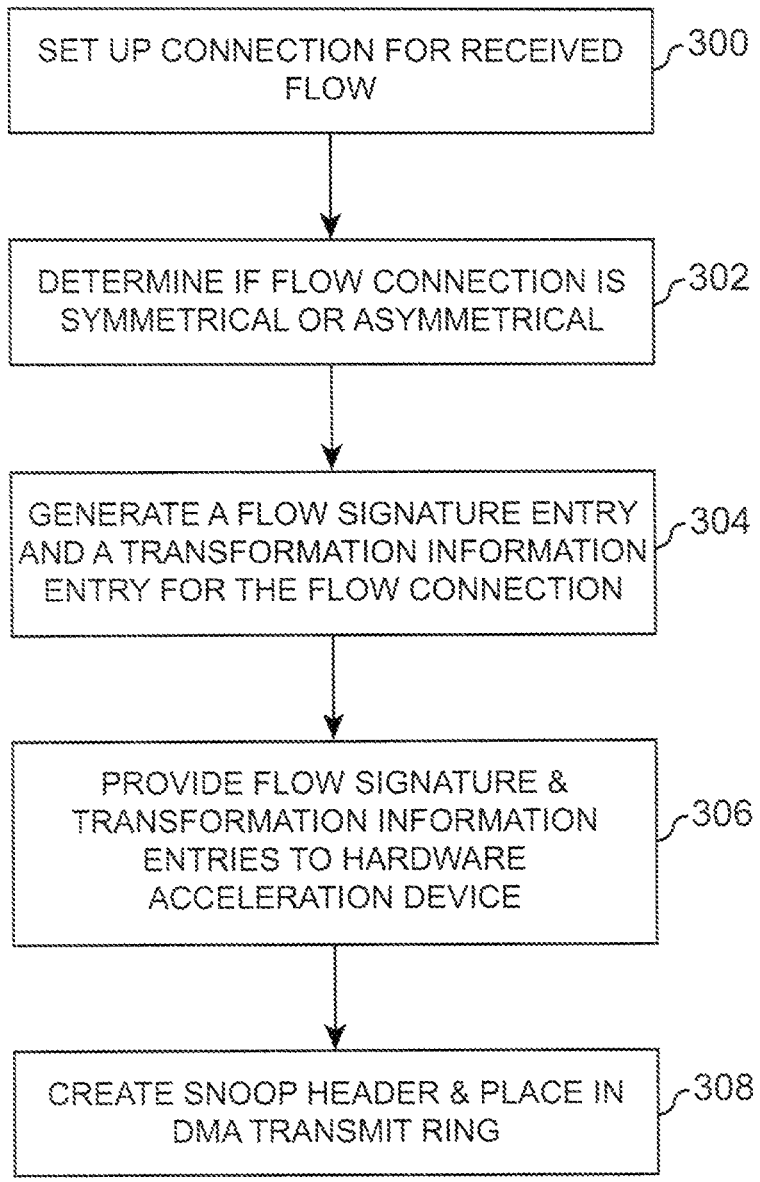
FIG. 3A is a flowchart of an exemplary process and method performed by the network traffic management device in accordance with an aspect of the present disclosure.

FIG. 3A illustrates a process performed by the software module of the network traffic management device in accordance with an aspect of the present disclosure. In particular to an aspect in FIG. 3A, the network traffic management system 110 will receive an incoming flow, whereby the software module will perform a connection load balance setup (Block 300). The software module will thereafter determine whether the connection for the received flow is asymmetric or symmetric in nature (Block 302).

Once the type of the flow connection is identified and determined, the software module of the network traffic management device 110 generates a flow signature entry and a transformation information entry for both directions of flow (Block 304). In an aspect, the flow signature may contain VLAN ID information, source IP and destination IP as well as source port, and/or destination port information. It is contemplated that additional and/or different data may be included in the flow signature in an aspect of the present disclosure.

The software module of the network traffic management device 110 then provides the generated flow signature entry and transformation information entry to a hardware acceleration device, such as an ASIC/FPGA hardware device (e.g. high speed bridge or "HSB") of the network traffic management device 110 (Block 306). The software module then creates a snoop header which contains two flow entries, one for each half of the connection, which is then placed on a DMA transmit ring (Block 308). As will be described in more detail below, the hardware acceleration device, upon receiving this information from the software module, will create corresponding flow signature and transformation entries for its own use whenever hardware acceleration is desired.

When communicating with the high speed bridge, the software engine of the network traffic management device 110 can either embed a header with the flow type, signature and flow transformation information, together with the actual data or pass flow information header via one or more unidirectional based flow creation messages. The protocol header provides sufficient connection and flow information for the correct creation of flow entry in the high speed bridge. The method of embedding the flow header along with actual data can be used for both symmetric and asymmetric flow connection to save extra control network bandwidth. Accordingly, the flow association is decoupled from any single connection session, such that each flow can now be handled properly and uniquely according to the flow nature.

In an aspect, the network traffic management device may apply the process in various load balancing scenarios. For example, the connection may employ a Direct Server Return (DSR), which is an asymmetric-based load balancing option where the server 102, when responding to a client request, sends the response directly to the client device 104, thereby bypassing the network traffic management device 110. In this scenario, the software module of the network traffic management device 110 will send the flow signature entry and the transform information entry to the hardware acceleration device only for flow traveling in the first flow direction (i.e. from client to server).

In another example, the connection may be a HTTP one-connect, whereby the network traffic management device 110 is configured to reuse multiple connections for the second segment (i.e. between the device 110 and the server 102) for multiple client devices 104. In this scenario, the network traffic management device 110 is configured to have the software module handle the second flow segment (i.e. from server to client). At the same time, the software module is configured to provide the flow signature and transform information entries to the hardware acceleration device incoming first flow segment and the outgoing second flow segments. Accordingly, the hardware acceleration device will be configured to handle only the flows between the client device 104 and the network traffic management device 110. Accordingly, this enables the flexibility of dealing with all kinds of hardware flow acceleration based on the nature, type or other factor of the connection irrespective of whether it is symmetric or asymmetric in nature.

Figure 3B:
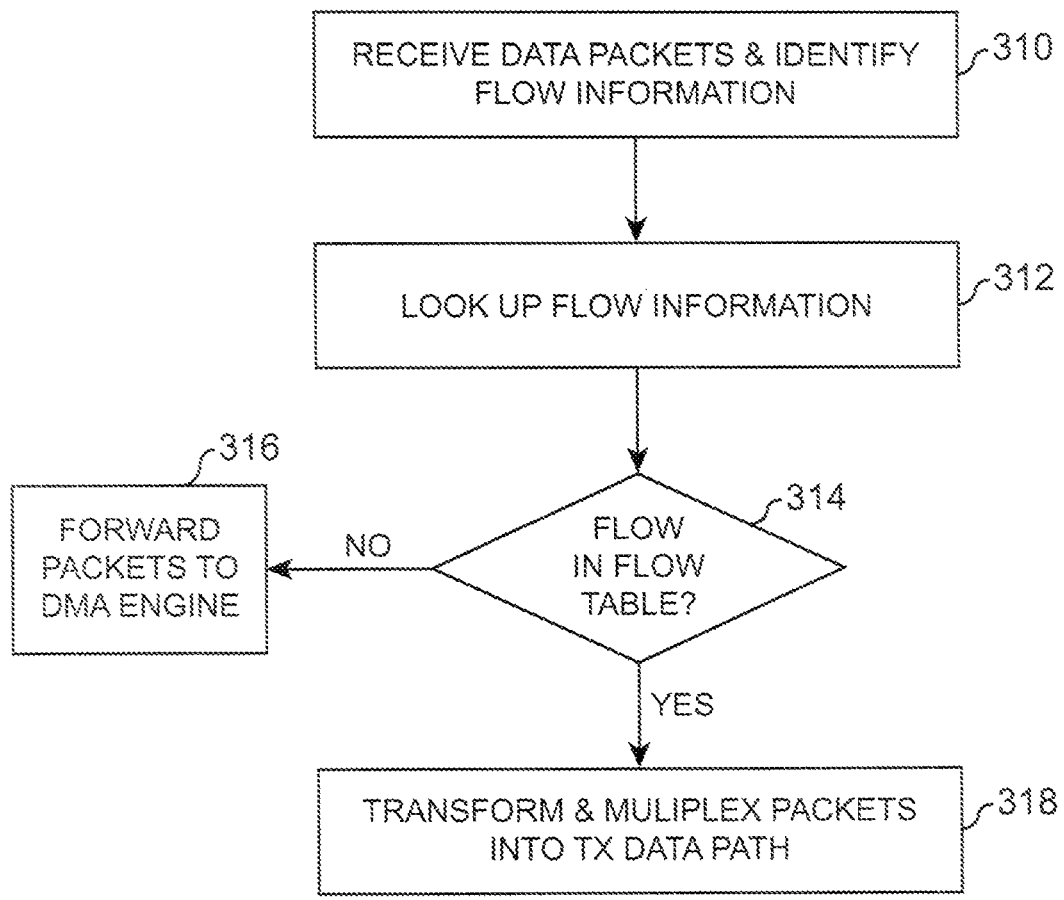
FIG. 3B is a flowchart of an exemplary process and method performed by the network traffic management device in accordance with an aspect of the present disclosure.

FIG. 3B illustrates a method performed by the hardware acceleration device in accordance with an aspect of the present disclosure. The functionality of the high speed bridge is based two processes: flow detection and packet transformation. Packet transform information is stored in a flow table on a per flow basis, wherein each data packet received at the network traffic management device 110 is checked to see if its flow is present in the flow table. If it is, the information from the table is used to transform the packet which is then directly forwarded back to the network. If the packet has a flow which is not in the table, the packet is forwarded to the software module for further processing.

Referring back to FIG. 3B, the HSB, upon receiving data packets from a client device 104, server 102 or other network traffic management device 110, identifies the flow information associated with the received packets (Block 310). The HSB thereafter looks up flow information for the received data packets in a Flow Table (Blocks 312 & 314). Packets without flows in the Flow Table are forwarded to the DMA engines for delivery to the core or processor 200 (Block 316). Packets with flows present in the flow table are transformed and multiplexed into the transmission or Tx Data Path (Block 318).

Figure 4:
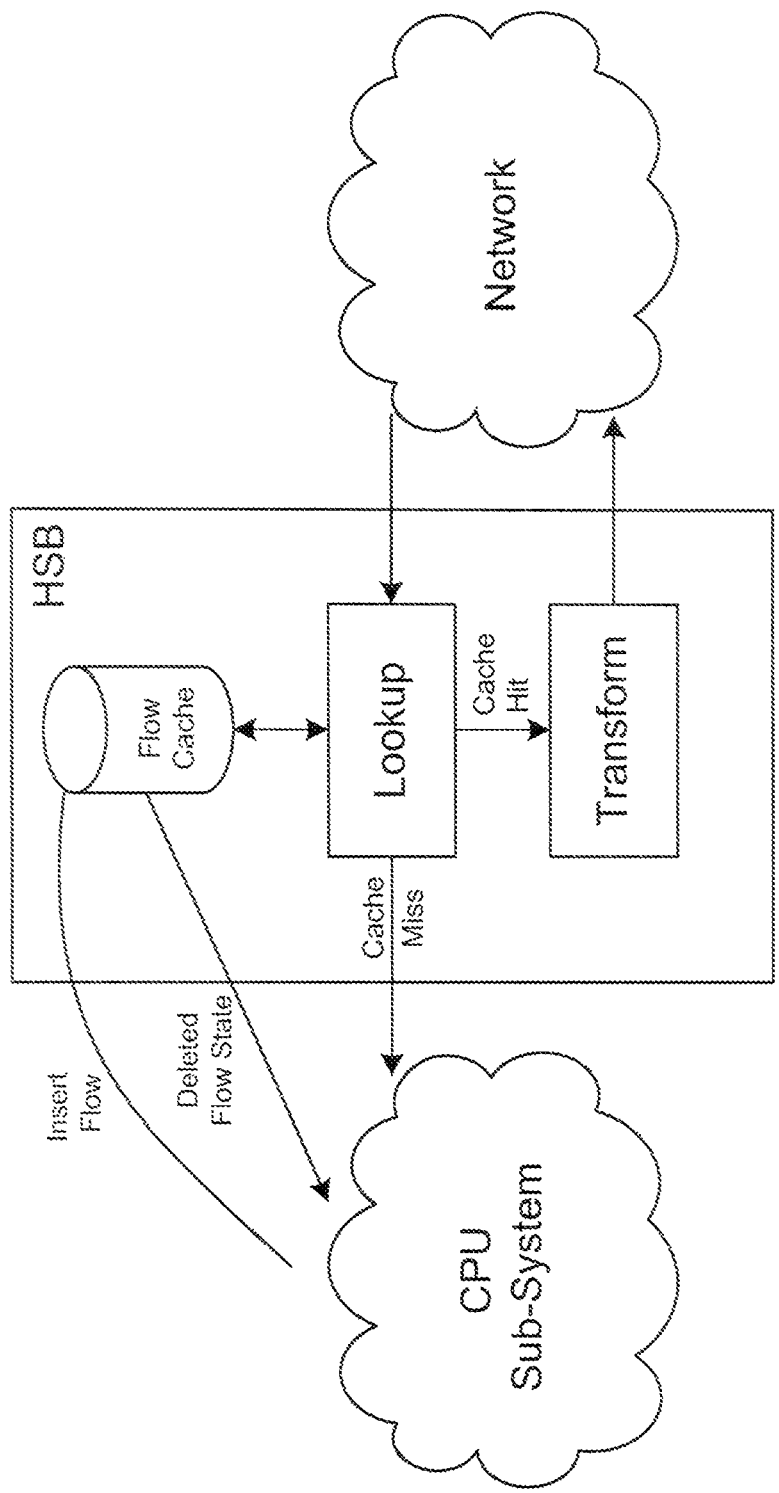
FIG. 4 illustrates a block diagram of the high speed bridge (HSB) in accordance with an aspect of the present disclosure.

FIG. 4 illustrates a block diagram of the high speed bridge (HSB) in accordance with an aspect of the present disclosure. As shown in FIG. 4, the flow table used by the HSB can be thought of as a flow cache. As connections are established by software, some are identified as good candidates for hardware transform offload. The flows associated with these connections are pushed or inserted by the software module into the HSB flow cache. Other connections are identified as poor candidates for offload, and their flows are kept by the software module. Flows are deleted from the cache when they become idle or collide with a newer flow. Deleted flows have their flow state information returned to software via a DMA mechanism, as shown in FIG. 4.

The benefit of the HSB shown in FIG. 4 is realized from the fact that each packet that can be fully processed in hardware and returned directly to the network so that valuable CPU resources are not consumed. The benefits of these savings are felt in the conservation of the CPU cycles, I/O bandwidth, memory bandwidth, and CPU cache line turnover. In particular, large packets transiting the CPU sub-system just for header transformation represent a significant load on these elements of the CPU sub-system. When the HSB handles these packets directly, it considerably enhances the systems overall L4 performance.

Figure 5:
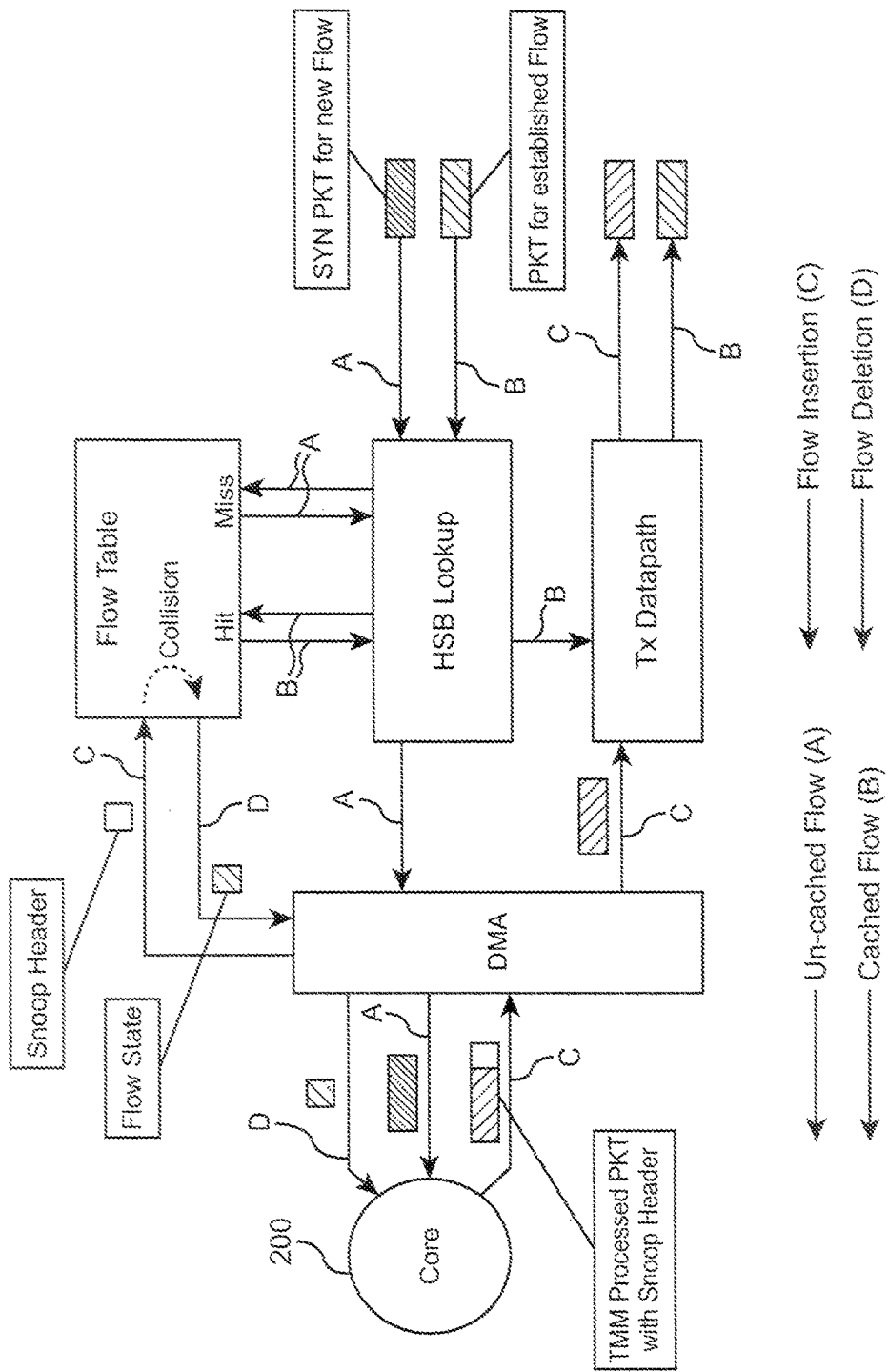
FIG. 5 illustrates a functional diagram of the HSB operating in conjunction with at least one processor in accordance with an aspect of the present disclosure.

FIG. 5 illustrates a functional diagram of the HSB operating in conjunction with at least one processor in accordance with an aspect of the present disclosure. FIG. 5 illustrates the elements used to implement functionality of the HSB. In an aspect, the Flow Table is an SRAM based cache of flows available for direct HSB processing. The HSB Lookup module receives packets from the network and looks up their flows in the Flow Table. Packets with flows present in the table are transformed and multiplexed into the transmission or Tx Data Path. Packets without flows in the Flow Table are forwarded to the DMA engines for delivery to the core or processor 200.

As shown in FIG. 5, there are different possible packet flow scenarios for the HSB. In an aspect, where the packet flow is un-cached, as shown by Arrow A, the packet received from the network is looked up and its flow is not found in the flow table. There are many reasons for a flow to not be in the table. This may be a new flow, the software module may have chosen not to cache the flow, or the flow may have been bumped out the table. In any case, the packet is forwarded, unmodified, to the DMA engines for delivery to the core.

For cached flow, shown as Arrow B, the packet received from the network is looked up and a matching entry is found in the flow table. Flow transform information is read from the flow table and applied to the packet. Flow state information is then written back into the table entry. The transformed packet is multiplexed into the TX Data Path for transmission back to the network.

For the scenario where there is flow insertion, as shown by Arrow C, if the software module determines that a connection should be offloaded to the HSB, it creates a snoop header. The snoop header contains two flow entries, one for each half of the connection. Optionally, either of the two flows can be marked as invalid. The snoop header is attached to the front of a frame which is then placed on a DMA transmit ring. Typically, the snoop header and its attached frame are associated with the same connection but this is not required. The software module marks the DMA descriptor to indicate that a snoop header is attached. The DMA hardware detects the snoop header, removes it, and forwards the frame to the TX Data Path. The snoop header is separately passed to the Flow Table for insertion.

For the scenario where there is flow deletion, as shown by Arrow D, the HSB can choose to delete a flow from the Flow Table for several reasons. These include a collision with a newly inserted flow or an old flow being scrubbed from the table. When a flow is deleted, the flow state information is read from the table and forwarded to the DMA engine. The DMA engines uses a management DMA ring to transfer flow state information to the core 200.

Figure 6A:
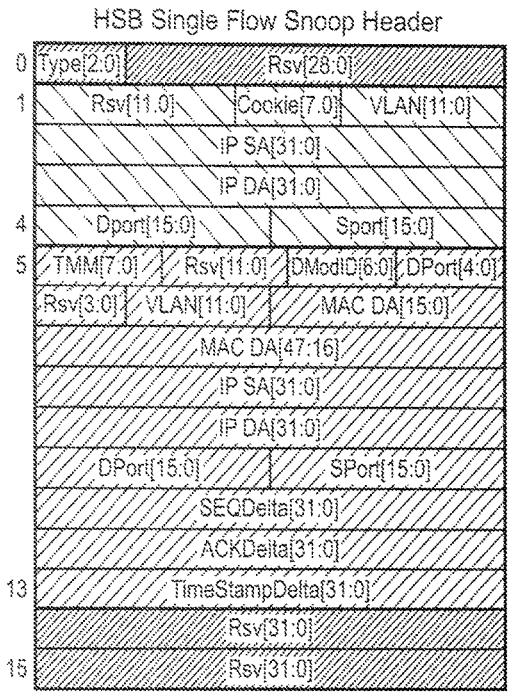
FIG. 6A illustrates an example HSB single flow snoop header in accordance with an aspect of the present disclosure.
Figure 6A:
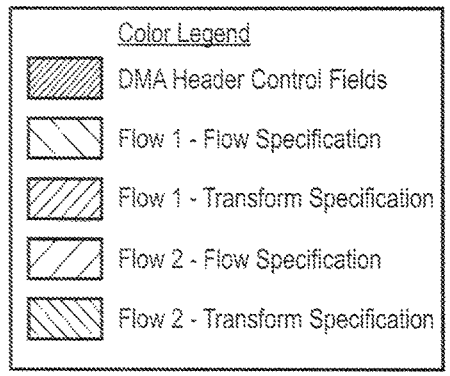
Figure 6B:
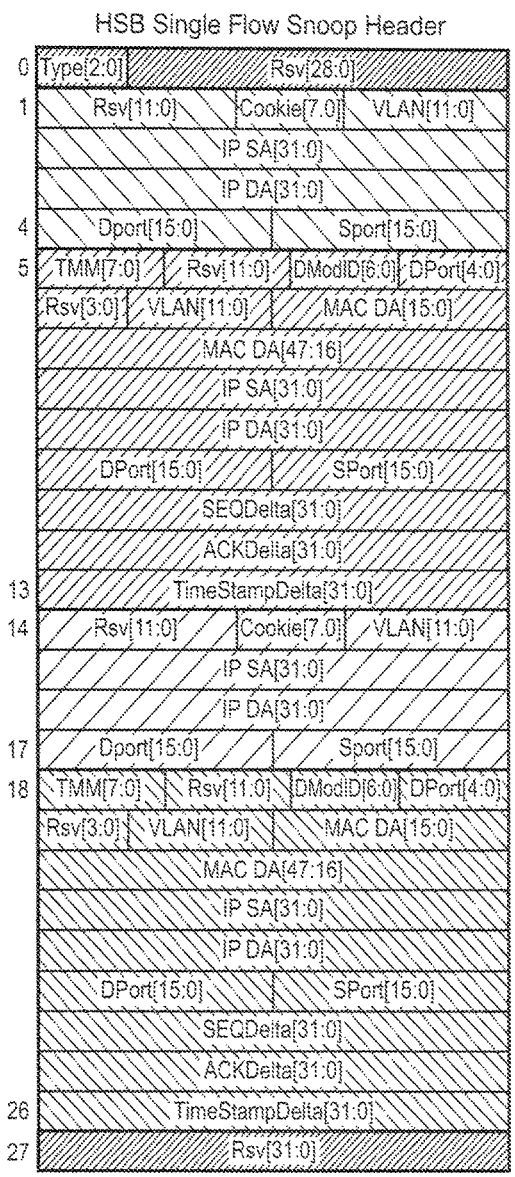
FIG. 6B illustrates an example HSB double flow snoop header in accordance with an aspect of the present disclosure.

Regarding the snoop header described above, FIG. 6A illustrates a HSB single flow snoop header, whereas FIG. 6B illustrates a HSB double flow snoop header, both of which are in accordance with an aspect of the present disclosure. In an aspect, the single flow format in FIG. 6A is 64 bytes and contains the flow specification and transform specification for a single flow, although other byte sizes are contemplated. The double flow format shown in FIG. 6B is 112 bytes and contains the flow specification and transform specification for two flows, although other byte sizes are contemplated. Both of these formats have 16 byte modulus sizes for hardware alignment reasons. The fields in the HSB Snoop Header are defined as follows. All reserved fields have all bits set to zero.

The 3-bit Type field declares the type of the header. The available types are shown in Table 1. Type 2 is used for single flow format headers. Type 3 is used for double flow format headers.

TABLE 1

DMA Buffer Header Types

| TYPE | Descriptor Format |
|---|---|
| 0 | Reserved |
| 1 | Standard RT |
| 2 | HSB Single Flow |
| 3 | HSB Double Flow |
| 4-7 | Reserved |

The 8-bit Cookie field is loaded by the software. The value is opaque to the hardware and is echoed back to software in the flow teardown message.

In an example aspect, the flow specification fields (for an aspect in which the protocol is IPv4/TCP over Ethernet) can be a 12-bit VLAN ID; a 32-bit IP Source Address; a 32-bit IP Destination Address; a 16-bit TCP Destination Port; and a 16-bit TCP Source Port, although additional, lesser and/or different values and headers may be utilized.

In an example aspect, the flow transformation fields can include a 8-bit TMM number (same as PDE number) which associates the flow with a particular TMM and PDE and can be used as an index to resolve source MAC and HiGig source fields. In an aspect, values from 0-31 are supported in the flow transformation fields, although other values are contemplated. In an example aspect, the flow transformation fields can include a 7-bit HiGig Destination Module ID, a 5-bit HiGig Destination Port number; a 12-bit VLAN ID; a 48-bit Destination MAC Address; a 32-bit IP Source Address; a 32-bit IP Destination Address; a 16-bit TCP Destination Port; a 16-bit TCP Source Port; a 32-bit Sequence Number Delta adjustment value; a 32-bit Acknowledgement Number Delta adjustment value; and/or a 32-bit Timestamp Delta adjustment value.

Figure 7:
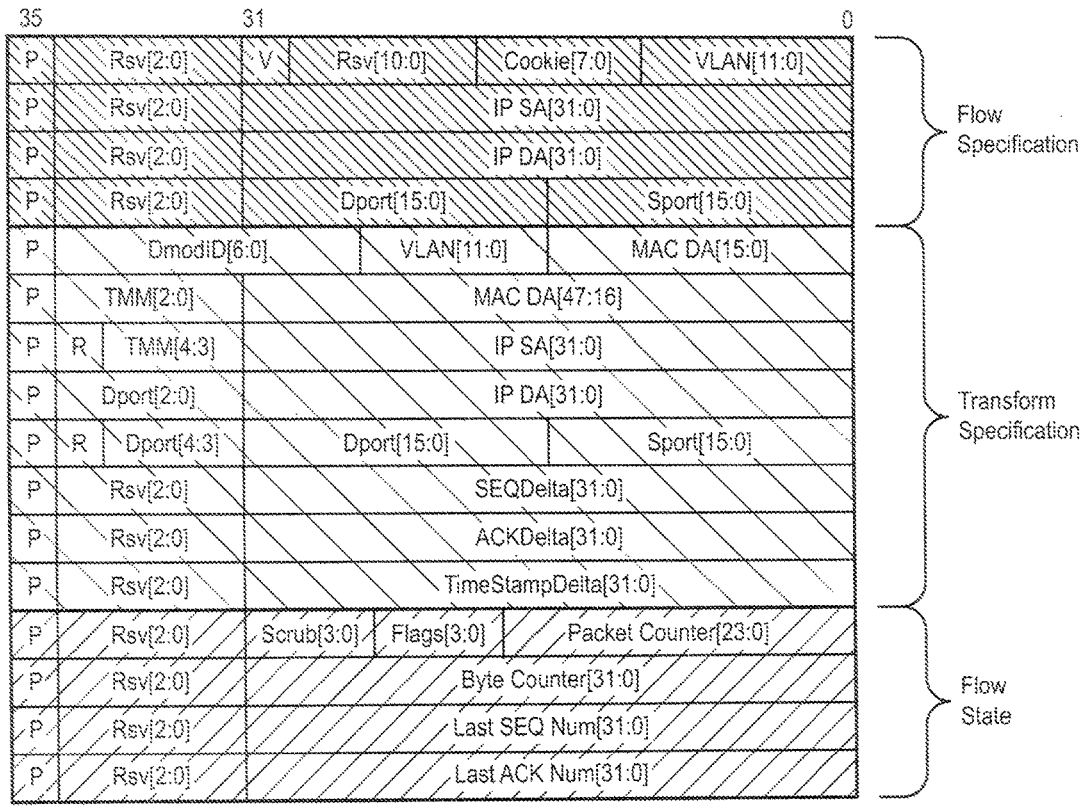
FIG. 7 illustrates an exemplary HSB Flow Cache table entry in accordance with an aspect of the present disclosure.

FIG. 7 illustrates an exemplary HSB Flow Cache table entry in accordance with an aspect of the present disclosure. The cache entry is laid out into sixteen 36-bits wide words. Each word is protected by parity and bit 35 is assigned as the parity (P) bit. The overall entry is divided into three functional sections; a 4-word flow specification, an 8-word transform specification, and a 4-word flow state. The size of these regions is based on the burst-of-4 access style of the underlying SRAM technology and must be respected. The flow specification is used to fully identify the flow and any packets belonging to it. The flow transformation is used to modify these packets for transmission back to the network without involvement of the software module. The flow state is used to track events in the flow that need to be communicated back to software module when the flow is torn down.

In an aspect, the flow cache entry fields, such as the flow specification, can include a 8-bit Cookie value which is opaque to the hardware and is echoed back to software in the flow teardown message. The flow specification, in an aspect, can include a 12-bit VLAN ID; a 32-bit IP Source Address; a 32-bit IP Destination Address; a 16-bit TCP Destination Port; and/or a 16-bit TCP Source Port.

Regarding the flow transformation field in the flow cache entry, the flow transformation field, in an aspect, can include: a 7-bit HiGig Destination Module ID; a 12-bit VLAN ID; a 48-bit Destination MAC Address; a 5-bit TMM number (e.g. PDE number used as an index to resolve source MAC and HiGig source fields, in which the TMM number is split across two SRAM words); a 32-bit IP Source Address; a 5-bit HiGig Destination Port number which can be split across two SRAM words; a 32-bit IP Destination Address; a 16-bit TCP Destination Port; a 16-bit TCP Source Port; a 32-bit Sequence Number Delta adjustment value; a 32-bit Acknowledgement Number Delta adjustment value; and/or a 32-bit Timestamp Delta adjustment value.

Regarding the flow state field in the flow cache entry, the flow state field, in an aspect, can include a 4-bit Scrub Count. The Scrub Count value reflects the age of the flow. The count is set/reset to its start value when the flow is inserted into the cache and each time a packet is processed for the flow. The count is decremented each time the scrubber accesses the flow. When this counter reaches zero the flow is torn down and removed from the cache. The counter is loaded to a value of 1 when a FIN packet is processed to accelerate aging of the flow.

In an aspect, the flow state field can include a 24-bit Packet Counter. In an example, the 24-bit Packet Counter is initialized to zero when the flow is inserted into the cache. The counter is incremented by one each time a packet is processed for the flow, wherein the final counter value is sent to the software when the flow is torn down.

In an aspect, the flow state field can include a 32-bit Byte Counter. For example, such a counter can be initialized to zero when the flow is inserted into the cache. The counter then increments by the packets byte length each time a packet is processed for the flow. The final counter value is sent to the software when the flow is torn down.

In an aspect, the flow state field can include a Last Sequence Number which records the last sequence number seen by the flow. The Last Sequence Number is initialized to zero when the flow is inserted, wherein the Number is updated with each packet processed for the flow until a FIN is seen. After the FIN is seen, the Last Sequence Number is no longer updated.

In an aspect, the flow state field can include a Last Acknowledgement Number. This Last Acknowledgement Number is initialized to zero when the flow is inserted, wherein the field records the last acknowledgment number seen by the flow. The number is updated with each packet processed for the flow with an ACK bit set.

The flow state field, in an aspect, can include: 4-bit Flow State Flags which record state events seen on the flow. The Flow State Flags are updated with each packet processed by the flow.

For instance in an aspect, FLAG[0] is reserved and is set to a value of zero.

FLAG[1] represents SEQ # Valid, whereby this bit is cleared when the flow is inserted into the cache or the bit is set if at least one packet has been processed by the flow and the Last SEQ Number field has a valid value.

In another aspect, FLAG[2] represents that ACK # Valid, wherein the bit is cleared when the flow is inserted into the cache or the bit is set if at least one ACK packet has been processed by the flow and the Last ACK Number field has a valid value.

In another aspect, FLAG[3] represents FIN Seen, whereby the bit is cleared when the flow is inserted into the cache or the bit is set when a FIN packet has been processed by the flow. When this bit is set, the scrub count is also set to 1 to accelerate aging of the flow.

Figure 8:
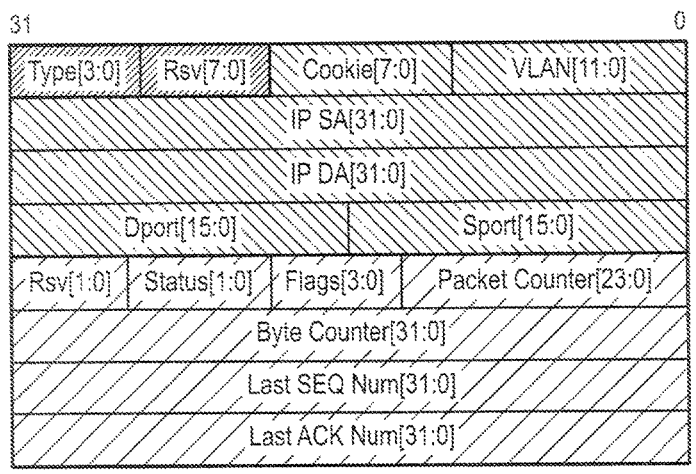
FIG. 8 illustrates an exemplary HSB Teardown descriptor in accordance with an aspect of the present disclosure.

FIG. 8 illustrates an exemplary HSB Teardown descriptor in accordance with an aspect of the present disclosure. The descriptor is 32 bytes in size and consumes two slots in the descriptor ring, although other byte sizes are contemplated.

Having thus described the basic concepts, it will be rather apparent to those skilled in the art that the foregoing detailed disclosure is intended to be presented by way of example only and is not limiting. Various alterations, improvements, and modifications will occur and are intended to those skilled in the art, though not expressly stated herein. The order that the measures and processes for providing secure application delivery are implemented can also be altered. Furthermore, multiple networks in addition to network 108 and LAN 106 could be associated with network traffic management device 110 from/to which network packets can be received/transmitted, respectively. These alterations, improvements, and modifications are intended to be suggested by this disclosure, and are within the spirit and scope of the examples. Additionally, the recited order of processing elements or sequences, or the use of numbers, letters, or other designations therefore, is not intended to limit the claimed processes and methods to any order except as can be specified in the claims.

What is claimed is:

1. A method for data packet processing implemented by a network traffic management system operating in a network environment comprising one or more network traffic management devices, one or more server devices, or one or more client devices, wherein at least one of the network traffic management devices includes a software component implemented by a general processing unit and a hardware component configured for packet processing, the method comprising:

receiving at the at least one network traffic management device one or more data packets associated with a sub-flow within a connection containing at least two sub-flows wherein each sub-flow is associated with a direction within the connection;

determining, by the at the at least one network traffic management device, when a flow entry exists in a flow cache table of the hardware component for a sub-flow associated with the one or more data packets;

when the determining indicates that the flow entry does not exist in the flow cache table, the software component performs the following actions:

generate a snoop header for the one or more data packets that comprises flow signature information comprising a flow signature entry and transformation information comprising a transformation data entry for each of a first flow direction of the sub-flow of the connection and a second flow direction opposite the first flow direction of the sub-flow of the connection, and provide the snoop header comprising the flow signature information and the transformation information to the hardware component for incorporation into the flow cache table for further processing of the one or more data packets associated with the sub-flow; and when the determining indicates that the flow entry does exist in the flow cache table, the hardware component performs the following actions:

obtain the flow signature information and the transformation information from the flow cache table, transform the one or more data packets using at least one of the flow signature information and the transformation information, and transmit the one or more transformed data packets through the sub-flow of the connection associated with the one or more data packets.

2. The method of claim 1, wherein the hardware component is configured to be capable of extracting and using the flow signature entry and the transformation data entry from the snoop header to generate entries in the flow cache table for each of the first and second flow directions.

3. The method of claim 1, wherein the first flow direction comprises a first connection between one of the client devices and the at least one network traffic management device, and the second flow direction comprises a second connection between the at least one network traffic management device and one of the server devices or a third connection between one of the server devices and one of the clients devices.

4. The method of claim 1, wherein at least one of the first or second flow directions is asymmetrical.

5. The method of claim 1, further comprising selecting by the at least one of the network traffic management devices some of the one or more data packets for processing by the hardware component and selecting at least some other data packets for processing by the software component.

6. The method of claim 5, further comprising processing, by the software component, the at least some other data packets selected for processing by the software component rather than the hardware component for transmission through the sub-flow of the connection associated with the at least some other data packets without providing any flow signature and transformation information for the associated sub-flow to the hardware component.

7. The method of claim 1, further comprising removing, by the hardware component, the flow signature information and the transformation information for a particular sub-flow from the flow cache table when either there is a collision with the flow signature information and the transformation information of another sub-flow or the flow signature and transformation information has aged out.

8. A network traffic management device, comprising a hardware component configured for processing packets, one or more processors, and a software component, wherein:

the hardware component comprises configurable hardware logic configured to:

receive one or more data packets associated with a sub-flow within a connection containing at least two sub-flows wherein each sub-flow is associated with a direction within the connection;

determine when a flow entry exists in a flow cache table of the hardware component for a sub-flow associated with the one or more data packets; and the software component comprises memory comprising programmed instructions stored thereon and the one or more processors are configured to be capable of executing the stored programmed instructions to, when the determining indicates that the flow entry does not exist in the flow cache table:

generate a snoop header for the one or more data packets that comprises flow signature information comprising a flow signature entry and transformation information comprising a transformation data entry for each of a first flow direction of the sub-flow of the connection and a second flow direction opposite the first flow direction of the sub-flow of the connection, and provide the snoop header comprising the flow signature information and the transformation information to the hardware component for incorporation into the flow cache table for further processing of the one or more data packets associated with the sub-flow; and the configurable hardware logic component is further configured to, when the determining indicates that the flow entry does exist in the flow cache table:

obtain the flow signature information and the transformation information from the flow cache table, transform the one or more data packets using at least one of the flow signature information and the transformation information, and transmit the one or more transformed data packets through the sub-flow of the connection associated with the one or more data packets.

9. The network traffic management device of claim 8, wherein the hardware component is configured to be capable of extracting and using the flow signature entry and the transformation data entry from the snoop header to generate entries in the flow cache table for each of the first and second flow directions.

10. The network traffic management device of claim 8, wherein the first flow direction comprises a first connection between a client device and the network traffic management device, and the second flow direction comprises a second connection between the network traffic management device and a server device or a third connection between the server device and the clients device.

11. The network traffic management device of claim 8, wherein at least one of the first or second flow directions is asymmetrical.

12. The network traffic management device of claim 8, wherein the one or more processors are configured to be capable of executing the stored programmed instructions to select some of the one or more data packets for processing by the hardware component and select at least some other data packets for processing by the software component.

13. The network traffic management device of claim 12, wherein the one or more processors are configured to be capable of executing the stored programmed instructions to process the at least some other data packets selected for processing by the software component rather than the hardware component for transmission through the sub-flow of the connection associated with the at least some other data packets without providing any flow signature and transformation information for the associated sub-flow to the hardware component.

14. The network traffic management device of claim 8, wherein the configurable hardware logic of the hardware component is further configured to remove the flow signature information and the transformation information for a particular sub-flow from the flow cache table when either there is a collision with the flow signature information and the transformation information of another sub-flow or the flow signature and transformation information has aged out.

15. A non-transitory computer readable medium having stored thereon instructions for processing network packets comprising executable code which when executed by one or more processors, causes the one or more processors to, when a hardware component determines that a flow entry does not exist in a flow cache table:

generate a snoop header for the one or more data packets that comprises flow signature information comprising a flow signature entry and transformation information comprising a transformation data entry for each of a first flow direction of the sub-flow of the connection and a second flow direction opposite the first flow direction of the sub-flow of the connection, and provide the snoop header comprising the flow signature information and the transformation information to the hardware component for incorporation into the flow cache table for further processing of the one or more data packets associated with the sub-flow, wherein the hardware component comprises configurable hardware logic configured to, when the hardware component determines that the flow entry does exist in the flow cache table:

obtain the flow signature information and the transformation information from the flow cache table, transform the one or more data packets using at least one of the flow signature information and the transformation information, and transmit the one or more transformed data packets through the sub-flow of the connection associated with the one or more data packets.

16. The non-transitory computer readable medium of claim 15, wherein the hardware component is configured to be capable of extracting and using the flow signature entry and the transformation data entry from the snoop header to generate entries in the flow cache table for each of the first and second flow directions.

17. The non-transitory computer readable medium of claim 15, wherein the first flow direction comprises a first connection between a client device and a network traffic management device, and the second flow direction comprises a second connection between the network traffic management device and a server device or a third connection between the server device and the clients device.

18. The non-transitory computer readable medium of claim 15, wherein at least one of the first or second flow directions is asymmetrical.

19. The non-transitory computer readable medium of claim 15, wherein the executable code when executed by the one or more processors further causes the one or more processors to select some of the one or more data packets for processing by the hardware component and select at least some other data packets for processing by the software component.

20. The non-transitory computer readable medium of claim 19, wherein the executable code when executed by the one or more processors further causes the one or more processors to process the at least some other data packets selected for processing by the software component rather than the hardware component for transmission through the sub-flow of the connection associated with the at least some other data packets without providing any flow signature and transformation information for the associated sub-flow to the hardware component.

21. The non-transitory computer readable medium of claim 19, wherein the configurable hardware logic of the hardware component is further configured to remove the flow signature information and the transformation information for a particular sub-flow from the flow cache table when either there is a collision with the flow signature information and the transformation information of another sub-flow or the flow signature and transformation information has aged out.

* * * * *